(12) United States Patent
McLachlan et al.

(10) Patent No.: US 8,766,981 B2
(45) Date of Patent: Jul. 1, 2014

(54) SYSTEM AND METHOD FOR VISUALIZING TRACE OF COSTS ACROSS A GRAPH OF FINANCIAL ALLOCATION RULES

(71) Applicant: Apptio, Inc., Bellevue, WA (US)

(72) Inventors: Paul Damien McLachlan, Newcastle, WA (US); William Byron Moeller, Seattle, WA (US); Brian John Bero, Woodinville, WA (US); Tavis Dean Elliott, Bothell, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 13/917,478

(22) Filed: Jun. 13, 2013

(65) Prior Publication Data

US 2014/0006085 A1     Jan. 2, 2014

Related U.S. Application Data

(63) Continuation of application No. 13/365,150, filed on Feb. 2, 2012.

(51) Int. Cl.
*G06T 11/20*     (2006.01)

(52) U.S. Cl.
USPC .............. 345/440; 705/30; 705/400; 707/602

(58) Field of Classification Search
USPC ........................................ 345/441
See application file for complete search history.

(56) References Cited

U.S. PATENT DOCUMENTS

| | | |
|---|---|---|
| 5,249,120 A | 9/1993 | Foley |
| 5,799,286 A | 8/1998 | Morgan et al. |
| 5,970,476 A | 10/1999 | Fahey |
| 5,991,741 A | 11/1999 | Speakman et al. |
| 6,014,640 A | 1/2000 | Bent |
| 6,032,123 A | 2/2000 | Jameson |
| 6,208,993 B1 | 3/2001 | Shadmon |
| 6,308,166 B1 | 10/2001 | Breuker et al. |
| 6,507,825 B2 | 1/2003 | Suh |
| 6,578,005 B1 | 6/2003 | Lesaint et al. |
| 6,839,719 B2 | 1/2005 | Wallace |
| 6,983,321 B2 | 1/2006 | Trinon et al. |

(Continued)

OTHER PUBLICATIONS

"Notice from the European Patent Office dated Oct. 1, 2007 concerning business methods," Official Journal EPO, Nov. 2007, pp. 592-593.

(Continued)

*Primary Examiner* — Ke Xiao
*Assistant Examiner* — F. M. Hossain
(74) *Attorney, Agent, or Firm* — John W. Branch; Lowe Graham Jones PLLC

(57) ABSTRACT

Embodiments are directed towards budgeting and forecasting of information technology and services. In at least one of the various embodiments, financial allocation models may include multiple cost objects and one or more allocation rules. In at least one of the various embodiments, allocation rules may determine how costs associated with cost objects may be allocated to other cost objects. In at least one of the various embodiments, costs corresponding to one or more selected cost objects may be traced within a financial allocation model. Also, costs associated with multiple cost line items from different cost objects may simultaneously traced for efficient cross-referencing of disparate cost line items. Further, in at least one of the various embodiments, a display of the cost traces may be rendered and displayed to provide a visualization of the traced costs.

20 Claims, 26 Drawing Sheets

(56) References Cited

U.S. PATENT DOCUMENTS

| | | | |
|---|---|---|---|
| 7,634,431 B2 | 12/2009 | Stratton | |
| 7,742,961 B2 | 6/2010 | Aaron et al. | |
| 7,774,458 B2 | 8/2010 | Trinon et al. | |
| 7,783,759 B2 | 8/2010 | Eilam et al. | |
| 7,930,396 B2 | 4/2011 | Trinon et al. | |
| 7,933,861 B2 | 4/2011 | Zadorozhny | |
| 7,966,235 B1 | 6/2011 | Capelli et al. | |
| 8,024,241 B2 | 9/2011 | Bailey et al. | |
| 8,175,863 B1 | 5/2012 | Ostermeyer et al. | |
| 8,423,428 B2* | 4/2013 | Grendel et al. | 705/26.81 |
| 8,484,355 B1 | 7/2013 | Lochhead et al. | |
| 2002/0123945 A1 | 9/2002 | Booth et al. | |
| 2003/0083888 A1 | 5/2003 | Argenton et al. | |
| 2003/0139960 A1 | 7/2003 | Nishikawa et al. | |
| 2003/0172368 A1 | 9/2003 | Alumbaugh et al. | |
| 2003/0236721 A1* | 12/2003 | Plumer et al. | 705/30 |
| 2004/0093344 A1 | 5/2004 | Berger et al. | |
| 2004/0111509 A1 | 6/2004 | Eilam et al. | |
| 2004/0186762 A1 | 9/2004 | Beaven et al. | |
| 2005/0060317 A1 | 3/2005 | Lott et al. | |
| 2005/0120032 A1 | 6/2005 | Liebich et al. | |
| 2006/0080264 A1 | 4/2006 | Zhang et al. | |
| 2006/0085465 A1 | 4/2006 | Nori et al. | |
| 2006/0106658 A1 | 5/2006 | Johanson et al. | |
| 2006/0161879 A1 | 7/2006 | Lubrecht et al. | |
| 2006/0167703 A1 | 7/2006 | Yakov | |
| 2006/0190497 A1 | 8/2006 | Inturi et al. | |
| 2006/0200477 A1 | 9/2006 | Barrenechea | |
| 2006/0212334 A1 | 9/2006 | Jackson | |
| 2006/0224946 A1 | 10/2006 | Barrett et al. | |
| 2006/0228654 A1 | 10/2006 | Sanjar et al. | |
| 2006/0282429 A1 | 12/2006 | Hernandez-Sherrington et al. | |
| 2007/0113289 A1 | 5/2007 | Blumenau | |
| 2007/0124162 A1 | 5/2007 | Mekyska | |
| 2007/0198982 A1 | 8/2007 | Bolan et al. | |
| 2007/0226090 A1 | 9/2007 | Stratton | |
| 2007/0276755 A1 | 11/2007 | Rapp | |
| 2007/0282626 A1 | 12/2007 | Zhang et al. | |
| 2008/0033774 A1 | 2/2008 | Kimbrel et al. | |
| 2008/0201269 A1 | 8/2008 | Hollins et al. | |
| 2008/0295096 A1 | 11/2008 | Beaty et al. | |
| 2009/0012986 A1 | 1/2009 | Arazi et al. | |
| 2009/0018880 A1 | 1/2009 | Bailey et al. | |
| 2009/0100406 A1 | 4/2009 | Greenfield et al. | |
| 2009/0150396 A1 | 6/2009 | Elisha et al. | |
| 2009/0216580 A1 | 8/2009 | Bailey et al. | |
| 2009/0300173 A1 | 12/2009 | Bakman et al. | |
| 2010/0005014 A1 | 1/2010 | Castle et al. | |
| 2010/0005173 A1 | 1/2010 | Baskaran et al. | |
| 2010/0042455 A1 | 2/2010 | Liu et al. | |
| 2010/0082380 A1 | 4/2010 | Merrifield, Jr. et al. | |
| 2010/0125473 A1 | 5/2010 | Tung et al. | |
| 2010/0169477 A1 | 7/2010 | Stienhans et al. | |
| 2010/0211667 A1 | 8/2010 | O'Connell, Jr. | |
| 2010/0250421 A1* | 9/2010 | Ariff et al. | 705/35 |
| 2010/0250642 A1 | 9/2010 | Yellin et al. | |
| 2010/0293163 A1 | 11/2010 | McLachlan et al. | |
| 2010/0299233 A1 | 11/2010 | Licardi et al. | |
| 2010/0306382 A1 | 12/2010 | Cardosa et al. | |
| 2010/0325606 A1 | 12/2010 | Sundararajan et al. | |
| 2010/0332262 A1 | 12/2010 | Horvitz et al. | |
| 2011/0016214 A1 | 1/2011 | Jackson | |
| 2011/0016448 A1 | 1/2011 | Bauder et al. | |
| 2011/0022861 A1 | 1/2011 | Agneeswaran et al. | |
| 2011/0106691 A1 | 5/2011 | Clark et al. | |
| 2011/0167034 A1 | 7/2011 | Knight et al. | |
| 2011/0225277 A1 | 9/2011 | Freimuth et al. | |
| 2012/0066020 A1 | 3/2012 | Moon et al. | |
| 2012/0131591 A1 | 5/2012 | Moorthi et al. | |
| 2012/0232947 A1 | 9/2012 | McLachlan et al. | |
| 2012/0233217 A1 | 9/2012 | Purpus et al. | |
| 2012/0233547 A1 | 9/2012 | McLachlan | |
| 2013/0060595 A1 | 3/2013 | Bailey | |
| 2013/0103654 A1 | 4/2013 | McLachlan et al. | |
| 2013/0201193 A1 | 8/2013 | McLachlan et al. | |
| 2013/0282537 A1 | 10/2013 | Snider | |

OTHER PUBLICATIONS

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

Extended European Search Report in EP Application No. 13151967.0-1955, mailed Apr. 19, 2013.

International Search Report and Written Opinion for International Patent Application No. PCT/US2010/035021 mailed Jul. 14, 2010.

International Preliminary Report on Patentability for International Patent Application No. PCT/US2010/035021 mailed Nov. 24, 2011.

International Search Report and Written Opinion for International Patent Application No. PCT/US2012/028353 mailed Oct. 31, 2012.

International Search Report and Written Opinion for International Patent Application No. PCT/US2012/028378 mailed on Sep. 12, 2012.

Official Communication for U.S. Appl. No. 12/467,120 mailed Oct. 4, 2011.

Official Communication for U.S. Appl. No. 12/467,120 mailed Jun. 20, 2012.

Official Communication for U.S. Appl. No. 12/467,120 mailed Aug. 29, 2012.

Official Communication for U.S. Appl. No. 12/467,120 mailed Mar. 26, 2013.

Official Communication for U.S. Appl. No. 13/324,253 mailed Sep. 25, 2012.

Official Communication for U.S. Appl. No. 13/324,253 mailed Jan. 10, 2013.

Official Communication for U.S. Appl. No. 13/324,253 mailed Mar. 19, 2013.

Official Communication for U.S. Appl. No. 13/452,628 mailed Apr. 22, 2013.

Official Communication for U.S. Appl. No. 14/033,130 mailed Dec. 16, 2013.

Official Communication for U.S. Appl. No. 13/324,253 mailed Jan. 23, 2014.

Official Communication for U.S. Appl. No. 13/675,837 mailed Jan. 31, 2014.

Official Communication for U.S. Appl. No. 13/917,503 mailed Jan. 31, 2014.

Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.

Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.

Ward Miles, Optimizing for Cost in the Cloud (selection), AWS Summit, Slideshare Apr. 2012 http://www.slideshare.net/AmazonWebServices/optimizing-your-infrastructure-costs-on-aws.

Amazon Reserved Instances, Amazon Web Services, archives org, Jan. 14, 2013 http://web.archive.org/web/2012011453849/http://aws.amazon.com/rds/reserved-instances/?.

Cost Optimisation with Amazon Web Services, extracted slides, Slideshare Jan. 30, 2012 http://www.slideshare.net/AmazonWebServices/cost-optimisation-with-amazon-web-services?from_search=1.

Deciding an Approach to the cloud AWS Reserved Instances, Cloudyn webpages, Feb. 28, 2012 https://www.cloudyn.com/blog/deciding-an-approach-to-the-cloud-aws-reserved-aws.

Ganesan Harish, Auto Scaling using AWS, Amazon Web Services AWS (selected slides), Apr. 20, 2011 http://www.slideshare.net/harishganesan/auto-scaling-using-amazon-web-services-aws.

(56) References Cited

OTHER PUBLICATIONS

"Activity Based Costing is the best allocation methodology," Apptio, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Preliminary Report on Patentability for International Patent Application No. PCT/US2012/028353 mailed Sep. 19, 2013.

International Preliminary Report on Patentability for International Patent Application No. PCT/US2012/028378 mailed Sep. 19, 2013.

Official Communication for U.S. Appl. No. 12/467,120 mailed Oct. 23, 2013.

Official Communication for U.S. Appl. No. 13/324,253 mailed Sep. 6, 2013.

Official Communication for U.S. Appl. No. 13/415,797 mailed Oct. 3, 2013.

Official Communication for U.S. Appl. No. 13/675,837 mailed Oct. 10, 2013.

Official Communication for U.S. Appl. No. 13/837,815 mailed Oct. 23, 2013.

Official Communication for U.S. Appl. No. 13/917,503 mailed Oct. 10, 2013.

Official Communication for U.S. Appl. No. 13/935,147 mailed Oct. 22, 2013.

Official Communication for U.S. Appl. No. 13/452,628 mailed Nov. 18, 2013.

\* cited by examiner

| Services.Name | Servers.Hostname | Rollup Ratio | Rollup Percent | Rollup Value |
|---|---|---|---|---|
| Lawson | genwlaws8 | 1 | 100% | $505 |
| Exchange Server 5.5 | obswexch23 | 1 | 100% | $969 |
| Cognos | orascogn44 | 1 | 100% | $818 |
| Infrastructure | gensinfr59 | 1 | 100% | $493 |
| SAP | genwsap74 | 1 | 100% | $502 |
| PeopleSoft | genwpeop79 | 1 | 100% | $718 |
| Infrastructure | genwinfr80 | 1 | 100% | $493 |
| SAP | genwsap81 | 1 | 100% | $505 |
| SAP | orassap83 | 1 | 100% | $828 |
| Website | webrwebs123 | 1 | 100% | $982 |

*FIG. 6*

Support — 1620

| Email | $1,000 |
|---|---|
| Printers | $1,000 |

Servers — 1622

| S1 | $200 | Email |
|---|---|---|
| S1 | $200 | Printers |
| S2 | $200 | Email |
| S2 | $200 | Printers |
| S3 | $200 | Email |
| S3 | $200 | Printers |
| S4 | $200 | Email |
| S4 | $200 | Printers |
| S5 | $200 | Email |
| S5 | $200 | Printers |

Servers — 1624

| S1 | $400 |
|---|---|
| S2 | $400 |
| S3 | $400 |
| S4 | $400 |
| S5 | $400 |

GL — 1626

| Payroll | $200 | S1 |
|---|---|---|
| Payroll | $200 | S2 |
| Payroll | $200 | S3 |
| Payroll | $200 | S4 |
| Payroll | $200 | S5 |
| Taxes | $100 | S1 |
| Taxes | $100 | S2 |
| Taxes | $100 | S3 |
| Taxes | $100 | S4 |
| Taxes | $100 | S5 |
| Rent | $100 | S1 |
| Rent | $100 | S2 |
| Rent | $100 | S3 |
| Rent | $100 | S4 |
| Rent | $100 | S5 |

GL — 1628

| Payroll | $1,000 |
|---|---|
| Taxes | $500 |
| Rent | $500 |

*FIG. 16B*

Support — 1630

| Email | $1,000 |
|---|---|
| Printers | $1,000 |

Business Units — 1632

| Marketing | $333.33 |
|---|---|
| Marketing | $333.33 |
| Sales | $333.33 |
| Sales | $333.33 |
| Engineering | $333.33 |
| Engineering | $333.33 |

Business Units — 1634

| Marketing | $666.67 |
|---|---|
| Sales | $666.67 |
| Engineering | $666.67 |

| GL | S1 | S2 | S3 | S4 | S5 |
|---|---|---|---|---|---|
| Payroll | $400 | $400 | $400 | $400 | $400 |
| Taxes | $200 | $200 | $200 | $200 | $200 |
| Rent | $200 | $200 | $200 | $200 | $200 |

1648

| Servers | Email | Printers | Telephone | Parking |
|---|---|---|---|---|
| S1 | $200 | $200 | $200 | $200 |
| S2 | $200 | $200 | $200 | $200 |
| S3 | $200 | $200 | $200 | $200 |
| S4 | $200 | $200 | $200 | $200 |
| S5 | $200 | $200 | $200 | $200 |

1650

| Support | Marketing | Sales | Engineering |
|---|---|---|---|
| Email | $333 | $333 | $333 |
| Printers | $333 | $333 | $333 |
| Telephone | $333 | $333 | $333 |
| Parking | $333 | $333 | $333 |

1652

| Servers | Marketing | Sales | Engineering |
|---|---|---|---|
| S1 | $266 | $266 | $266 |
| S2 | $266 | $266 | $266 |
| S3 | $266 | $266 | $266 |
| S4 | $266 | $266 | $266 |
| S5 | $266 | $266 | $266 |

1654

| GL | Marketing | Sales | Engineering |
|---|---|---|---|
| Payroll | $666 | $666 | $666 |
| Taxes | $333 | $333 | $333 |
| Rent | $333 | $333 | $333 |

1656

| GL | Marketing | Sales | Engineering |
|---|---|---|---|
| Payroll | $1,000 | $1,000 | $1,000 |
| Taxes | $500 | $500 | $500 |
| Rent | $500 | $500 | $500 |

*FIG. 16E*

SYSTEM AND METHOD FOR VISUALIZING TRACE OF COSTS ACROSS A GRAPH OF FINANCIAL ALLOCATION RULES

CROSS-REFERENCE TO RELATED APPLICATIONS

The present application is a Continuation of U.S. application Ser. No. 13/365,150 filed Feb. 2, 2012, entitled "SYSTEM AND METHOD FOR VISUALIZING TRACE OF COSTS ACROSS A GRAPH OF FINANCIAL ALLOCATION RULES," the benefit of the earlier filing date of which is hereby claimed under 35 U.S.C. §120 and 37 C.F.R. §1.78, and which is further incorporated by reference.

TECHNICAL FIELD

The present invention relates generally to computer automated activity based budgeting and forecasting, and more particularly, but not exclusively to tracing the allocation of costs among cost objects in a complex financial allocation model.

BACKGROUND

Businesses that strive to remain viable and successful in today's competitive commercial environment are required to adopt accurate and responsive budgeting practices. To improve efficiency, businesses use financial allocation models that apply modern budgeting and forecasting techniques. For some budget techniques, the complexity of the financial allocation model increases as the number of tracked activities and elements increases. Therefore, for larger enterprises, sophisticated computer programs and computing devices are often required to assist in generating useful and relevant budgets based on financial allocation models.

In some cases, the large number of items represented in a financial allocation model can make analysis of the financial allocation model difficult. Further, the size and complexity of a financial allocation model can make it difficult to trace the cost allocations between groups and/or items within the model. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein:

FIG. 6 illustrates a partial view of an allocation table including the results of applying an allocation rule in a financial allocation model in accordance with the embodiments;

FIGS. 16A-E illustrates a financial allocation model, allocation tables, and various operations made using the financial allocation model as an example in accordance with the embodiments;

DESCRIPTION OF THE VARIOUS EMBODIMENTS

Figure 1:
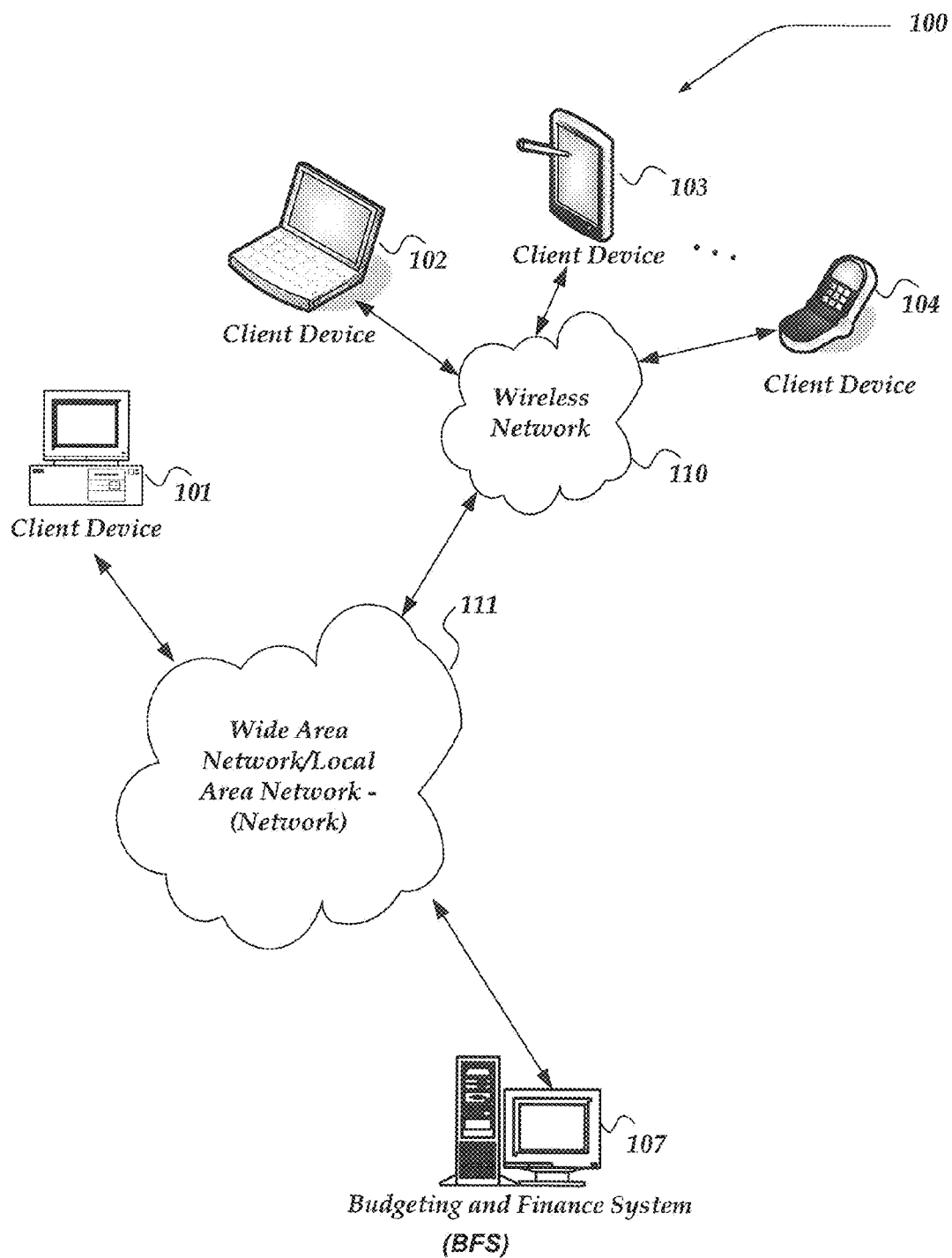
FIG. 1 is a system diagram showing components of an environment in which at least one of the various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on,"

As used herein, the term "Financial allocation model," refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "Cost line item," refers to a single line item in a budget (or finance allocation model) and its associated cost/expense. For example, the costs associated with a particular computer that is the email server may be a single item having a particular cost (e.g., the email server may correspond to a cost line item).

As used herein, the term "Cost object," refers to a set and/or class of cost line items that may be grouped together. For example, a collection of computers performing services such as email, web serving, enterprise resource planning, may represent separate cost line items and they may be grouped into the cost object Servers.

As used herein, the term "Allocation rules," refers to rules in the financial allocation model that determine how the costs/expenses from a cost object are allocated between/among other cost objects. Also, allocation rules may be assigned to individual cost line items. For example, if an email server cost line item has a value of $1000 an allocation rule may be defined such that 50% of the expense may be allocated to the Marketing department and 50% may be allocated to the Engineering department. Also, allocation rules may be applied at the cost object as well as the cost line item level.

As used herein, the term "Assignment ratios," refers to an allocation rule, or the results of applying one or more rules, of the distribution ratio of costs to cost line items or cost objects. For example, if $1000 may be allocated to cost object Servers, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the cost object.

As used herein, the "cost trace," or "cost tracing," refers to transforming the data in the financial allocation model to represent how the money related to the cost object and/or cost line item being traced flow through the financial allocation model. "Cost trace" may also refer to the visual representation the transformed financial allocation model.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards budgeting and forecasting of information technology and services. In at least one of the various embodiments, financial allocation models may include multiple cost objects and one or more allocation rules. In at least one of the various embodiments, allocation rules may determine how costs associated with cost objects may be allocated to other cost objects. In at least one of the various embodiments, costs corresponding to one or more selected cost objects may be traced within a financial allocation model. Also, costs associated with multiple cost line items from different cost objects may be simultaneously traced for efficient cross-referencing of disparate cost line items. Further, in at least one of the various embodiments, a display of the cost traces may be rendered and displayed to provide a visualization of the traced costs.

In at least one of the various embodiments, the cost object selected to have its costs traced may cause other cost objects in the financial allocation model to be analyzed and characterized based on the selected cost object. In at least one of the various embodiments, the cost trace for each cost object identified visually, or in any other manner, "below" the selected cost object may be determined. Also, in at least one of the various embodiments, the cost trace for each cost object identified visually, or in any other manner, "above" the selected cost object may be determined.

Illustrative Operating Environment

FIG. 1 shows components of one embodiment of an environment in which at least one of the various embodiments may be practiced. Not all the components may be required to practice various embodiments, and variations in the arrangement and type of the components may be made. As shown, system 100 of FIG. 1 includes local area networks ("LANs")/wide area networks ("WANs")—(network) 111, wireless network 110, client devices 101-104, and Budgeting and Finance System (BFS) 107.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-404 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Today, many of these devices include a capability to access and/or otherwise communicate over a network such as network 111 and/or even wireless network 110. Moreover, client devices 102-104 may access various computing applications, including a browser, or other web-based application.

In one embodiment, one or more of client devices 101-104 may be configured to operate within a business or other entity to perform a variety of services for the business or other entity. For example, client devices 101-104 may be configured to operate as a web server, an accounting server, a production server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 101-104 also may include at least one other client application that is configured to receive and/or send data, including budgeting and forecasting information, between another computing device. The client application may include a capability to provide requests and/or receive data relating to budget projects. The client application may initiate and/or receive data representing cost allocations between or among cost objects that may be part of the financial allocation model. In at least one of the various embodiments, client applications may receive and/or generate trace views of a budget project model. In some embodiments, the client application may employ processes such as described below in conjunction with FIGS. 4-22 to perform at least some actions.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client devices 102-104 and another computing device, network, or the like.

Network 111 is configured to couple network devices with other computing devices, including, BFS 107, client device (s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4 Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic. RF, infrared, and other wireless media. Such communication media is distinct from, however, processor-readable storage devices described in more detail below.

Figure 2:
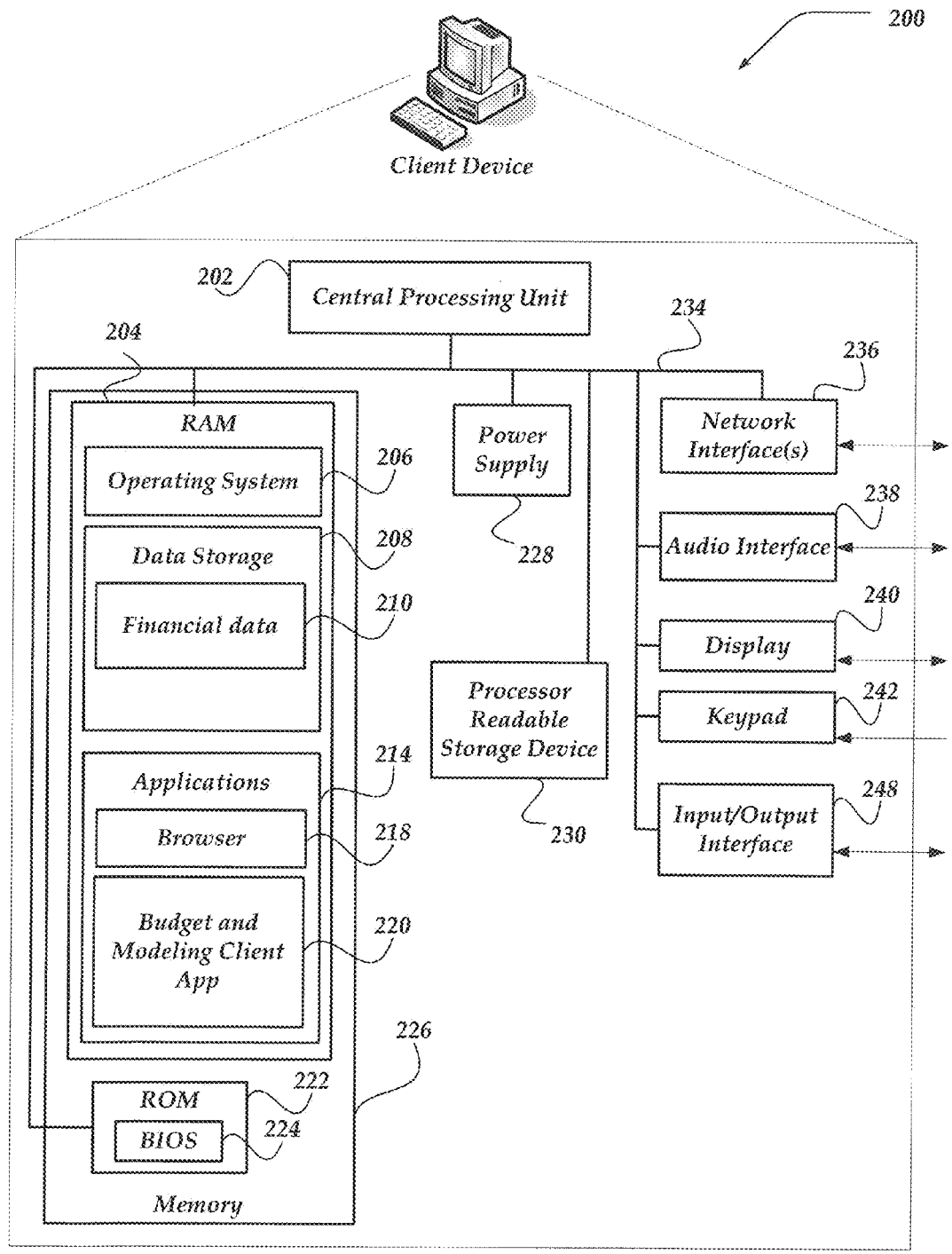
FIG. 2 shows one embodiment of a client device that may be included in a system in accordance with the embodiments.

BFS 107 may include virtually any network device usable to provide budgeting and finance services, such as network device 200 of FIG. 2. In one embodiment, BFS 107 employs various techniques to create and define budget projects and financial allocation models. BFS 107 may include applications for generating costs traces of cost objects within a financial allocation model. Furthermore, BFS 107 may include applications for visualizing the generated cost traces and cost objects.

Devices that may operate as BFS 107 include various network devices, including, but not limited to personal computers, desktop computers, multiprocessor systems, microprocessor-based or programmable consumer electronics, network PCs, server devices, network appliances, or the like. It should be noted that while BFS 107 is illustrated as a single network device, the invention is not so limited. Thus, in another embodiment, BFS 107 may represent a plurality of network devices. For example, in one embodiment, BFS 107 may be distributed over a plurality of network devices and/or implemented using cloud architecture.

Moreover, BFS 107 is not limited to a particular configuration. Thus, BFS 107 may operate using a master/slave approach over a plurality of network devices, within a cluster, a peer-to-peer architecture, and/or any of a variety of other architectures. Thus, BFS 107 is not to be construed as being limited to a single environment, and other configurations, and architectures are also envisaged. BFS 107 may employ processes such as described below in conjunction with FIGS. 4-22 to perform at least some of its actions, Illustrative Client Device FIG. 2 shows one embodiment of client device 200 that may be included in a system implementing at least one of the various embodiments, Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device (not shown) within client device 200. Further, as illustrated, data storage 208 may also store object relationship data 210. In some embodiments, financial data 210 may include a database, text, spreadsheet, folder, file, or the like, that may be configured to maintain and store various budget data, audit logs, device data, or the like. Such financial data 210 may also be stored within any of a variety of other computer-readable storage devices, including, but not limited to a hard drive, a portable storage device, or the like, such as illustrated by non-transitory computer-readable storage device 230. In yet other embodiments, data storage 208 may also store data associated with financial allocation models that may be part of one or more budget projects.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and budget and forecasting client application 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as BPS 107 of FIG. 1. In one embodiment, browser 218 may enable a user to view and/or manipulate budget projects, including creating budgets, modifying financial allocation models, selecting cost object for cost tracing, rendering visualizations of cost tracings, or the like.

In at least one of the various embodiments, a user may employ client device 200 to create and manage budgeting and finance projects and to access information stored or otherwise managed through BFS 107. In at least one of the various embodiments, a user may enter various types of data into a budgeting and finance system accessible through BFS 107, where the data may be heavily interrelated as might arise within business systems, spreadsheet type data, or the like. Also, in at least one of the various embodiments, the user may be enabled to perform a variety of actions on the data, including, queries, comparisons, summations, analysis, or the like. Also, in at least one of the various embodiments, a user may employ client 200 to create one more financial allocation models. In at least one of the various embodiments, budget and modeling client application 220 may be arranged to enable a user to create budget projects and financial allocation models. In at least one of the various embodiments, budget and modeling client application 220 may be arranged to generate cost traces for cost objects. Also, in at least one of the various embodiments, budget and modeling client application 220 may be arranged to generate and render visualizations of cost traces for cost objects in a financial allocation model.

In any event, budget and forecasting client application 220 may employ processes similar to those described below in conjunction with FIGS. 4-22 to perform at least some of its actions.

Illustrative Network Device

Figure 3:
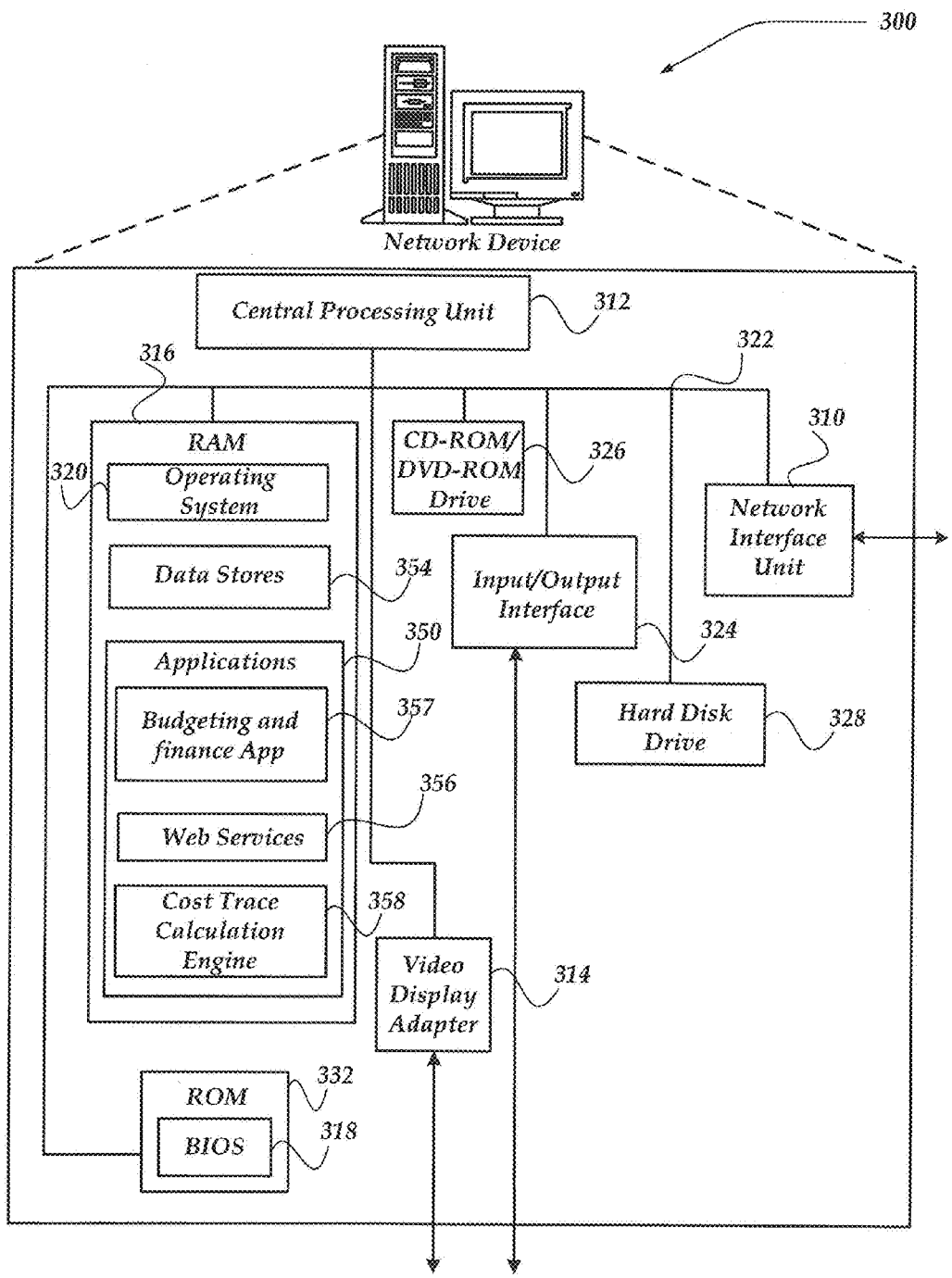
FIG. 3 shows one embodiment of a network device that may be included in a system implementing at least one of the various embodiments.

FIG. 3 shows one embodiment of network device 300 that may be included in a system implementing at least one of the various embodiments. Network device 300 may include many more or less components than those shown. The components shown, however, are sufficient to disclose an illustrative embodiment for practicing the invention. Network device 300 may represent, for example, BFS 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via, network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor-readable storage media. Processor-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology. Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computing device.

As shown, data stores 354 may include a database, text, spreadsheet, folder, file, or the like, that may be configured to maintain and store various financial allocation models, budget data, audit logs, device data, or the like. Data stores 354 may further include program code, data, algorithms, or the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include budgeting and forecasting application 357, web services 356, and tracing calculation engine 358.

Web services 356 represent any of a variety of services that are configured to provide content, over a network to another computing device. Thus, web services 356 include for example, a web server, a File Transfer Protocol (FTP) server, a database server, a content server, or the like. Web services 356 may provide the content over the network using any of a variety of formats, including, but not limited to WAP, HDML, WML, SGML, XML, compact HTML (cHTML), extensible (xHTML), or the like.

In one embodiment, web services 356 may provide an interface for accessing and manipulating data in a data store, such as data stores 354, or the like. In another embodiment, web services 356 may provide for interacting with a budgeting and finance application 357 that may enable a user to access and/or otherwise manage budgeting and finance services that may be provided through network device 300.

In at least one of the various embodiments, tracing calculation engine 358, may perform the calculations for tracing cost allocations between budget items. From the calculated tracing values tracing calculation engine 358 may generate trace views for visualizing the traced allocations costs.

In at least one of the various embodiments, budgeting and finance application 357 may enable operators to generate financial allocation models, budget models, cost objects, budget objects, budget items, allocation rules, establish calculation schedules, or the like. Also, in at least one of the various embodiments, the budgeting and finance application 357 may enable the generating of financial allocation models. Further, in at least one embodiment, tracing calculation engine 358 may enable the generation cost traces for cost objects within a financial allocation model. Also, in at least one of the various embodiments, cost trace calculation engine 358 may enable the rendering of visualizations of cost traces of cost objects.

In any event, web services 356, budgeting and forecasting application 357, and/or cost trace calculation engine 358 may employ processes, or parts of processes, similar to those described in conjunction with FIGS. 7-22 to perform at least some of its actions.

Generalized Operation

Figure 4:
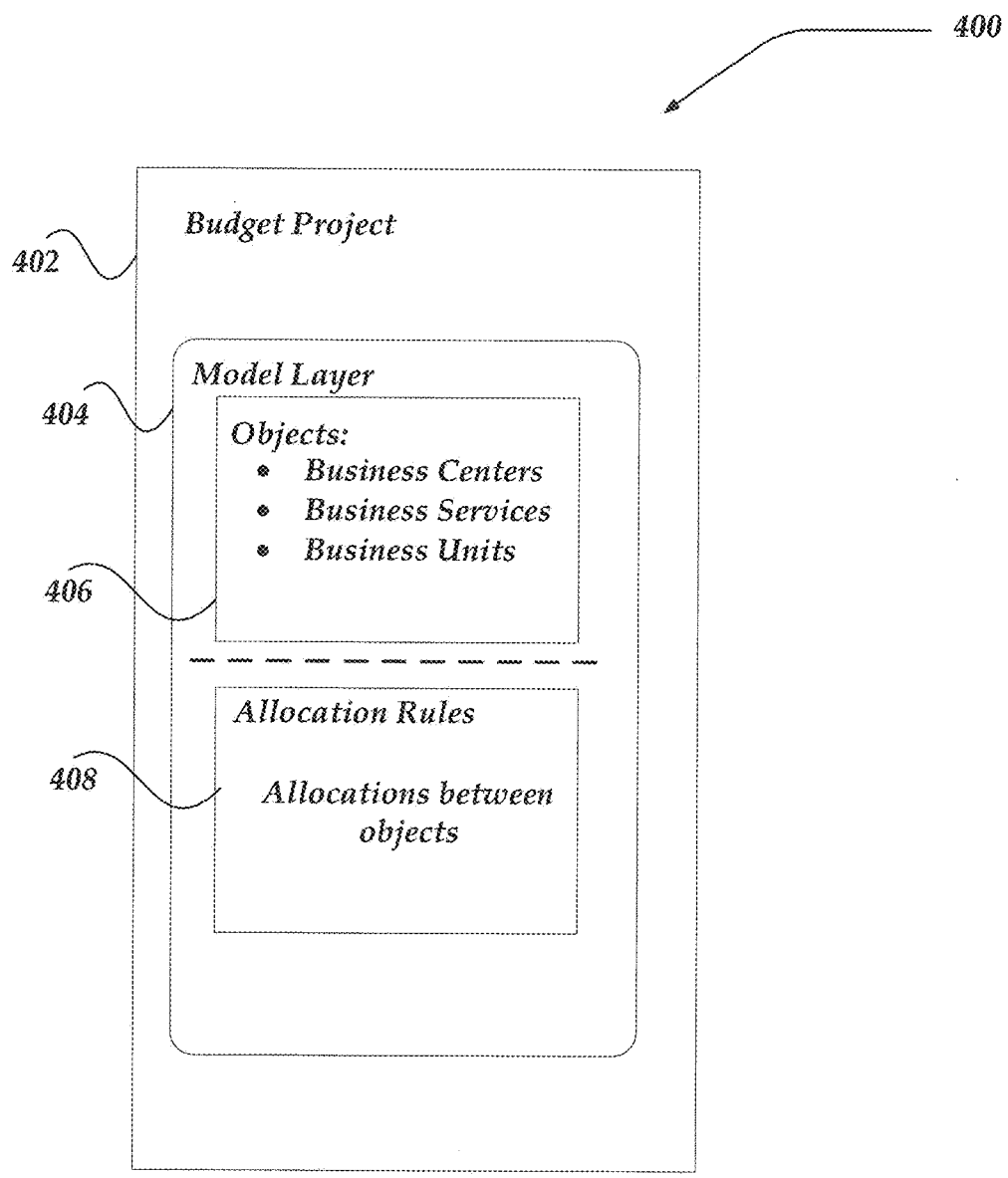
FIG. 4 illustrates a logical schematic of a budget project in accordance with the embodiments.

FIG. 4 illustrates a logical schematic of budget project 400 for at least one of the various embodiments. A budget project 400 may be a representation of an entire budget. In at least one of the various embodiments, budget projects may track time independent and separate from other budget projects. Independent time tracking may enable budget projects to have different or separate start dates, end dates, fiscal years, or the like. In at least one of the various embodiments, budget projects may be configured to represent a time range that may be advantageous for the particular budget being modeled. (e.g., 1 month, 3 months, 1 year, 5 years, or the like.) Also, in at least one of the various embodiments, budget projects may be arranged to reference one or more time increments ranging from at least days to years.

In at least one of the various embodiments, a budget project may have model layer 404 that includes the logical representation of all the entities, services, and items considered to be addressed by the budget. In at least one of the various embodiments, model layer 404 may include one or more objects 406 that may represent the entities, services, and items, that may be included in the budget. In at least one of the various embodiments, objects 406 may include business centers, business services, business units, servers, laptops, desktops, mobile devices, storage, projects, work tickets (such as for a help desk), cost centers, general ledger transactions, sub-ledger line items, rate cards, or the like. In most cases, model layer 404 may be comprised of objects 406 that represent the particular items a business intends to manage within a particular budget. Accordingly, each budget project may include a set of objects that may be unique for each business.

In at least one of the various embodiments, objects 406 may be implemented using software modules arranged to model objects 406 in a budget project 400. One of ordinary skill in the art will appreciate that such objects may be implemented using one or more computer programming languages, computer scripting languages, database stored procedures, or the like. Further, in at least one of the various embodiments, objects 406 may be stored and/or implemented using databases, including, SQL databases, object oriented databases, column-oriented databases, NoSQL databases, custom databases, or the like.

In at least one of the various embodiments, a budget project's model layer 404 may include allocation rules 408 that may define in part how objects 406 relate to each other within the context of a particular budget project. In at least one of the various embodiments, allocation rules 408 may be used to define how one object, such as Storage Services, may be allocated among other objects. Operators may arrange one or more allocation rules to match the entities being modeled within the budget. In at least one of the various embodiments, one or more allocation rules may be defined in part based on templates, user-interface dialog boxes, command-line commands, configuration files, policy rules, business rules, or the like.

In at least one of the various embodiments, allocation rules 408 may determine how budget costs may be propagated through the budget between and among at least the objects that make up the budget.

Figure 5:
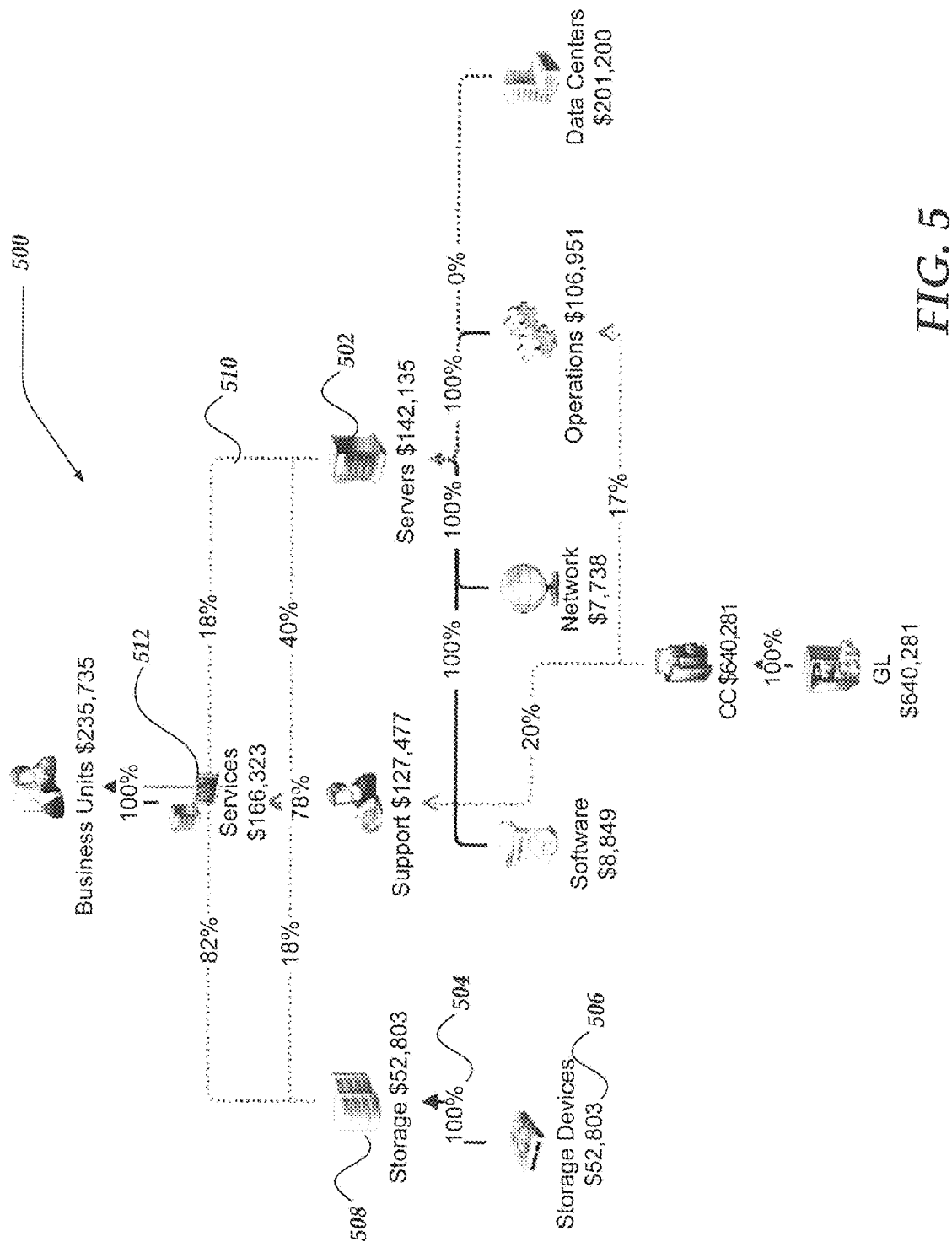
FIG. 5 illustrates a visualization of a financial allocation model in accordance with the embodiments.

FIG. 5 illustrates an embodiment of a visualization of financial allocation model 500. In one of the various embodiments, the financial allocation model's allocation rules may be represented as edges (the lines) and the cost objects may be represented as nodes (including an icon and textual name). In at least one of the various embodiments, each element in a financial allocation model may display a value summarizing the costs associated with cost object represented by the node. For example, in one of the various embodiments, node 502 represents cost object Servers that may be allocated $142,135 of the costs in financial allocation model 500. In at least one of the various embodiments, cost object Servers 502 may include one or more cost line items categorized as servers.

Furthermore, in at least one of the various embodiments, allocation rule information may be displayed on the edges between financial allocation model nodes. In some cases, the displayed information may represent a percentage, or ratio, of a cost or expense that may be allocated from one cost object to another. In at least one of the various embodiments, edge 504 indicates that 100% of costs of cost object Storage Devices 506 may be allocated to cost object Storage 508. In at least one of the various embodiments, the underlying allocation rules may control how costs and expenses can be allocated and/or propagated through the financial allocation model.

In at least one of the various embodiments, a user may be enabled to examine or modify allocation rules by clicking on one or more elements (e.g., nodes, edges, or the like) in the financial allocation model visualization to reveal additional detail and/or options.

FIG. 6 illustrates for at least one of the various embodiments of a partial view of allocation table 600 including the results of applying an allocation rule in a financial allocation model. In at least one of the various embodiments, if a user selects edge 510 using a user-interface (e.g., mouse, keyboard, or the like) allocation table 600 may be made visible and/or available to the user. In at least one of the various embodiments, allocation table 600 may be include assignment ratios of the costs associated with Servers 502 that may be allocated to Services 512 by way of the allocation rules represented by edge 510.

In at least one of the various embodiments, allocation table 600 illustrates how costs may be allocated between some servers 604 and some services 602. For example, row 606 of table 600 can be read as "the server genwlaws8 allocates 100% of its cost—$505—to the Lawson service." In some embodiments, depending upon the allocation rule, not all of a server's cost may be allocated, or a server's cost may be split among multiple destination cost objects according to a configuration, rule, setting, formula, or the like. However, in at least one of the various embodiments, unallocated (or over allocated—greater than 100%) costs usually indicate an error in the allocation rules. Identifying the sources of such errors may be facilitated by generating a cost trace of the relevant cost objects.

Figure 7:
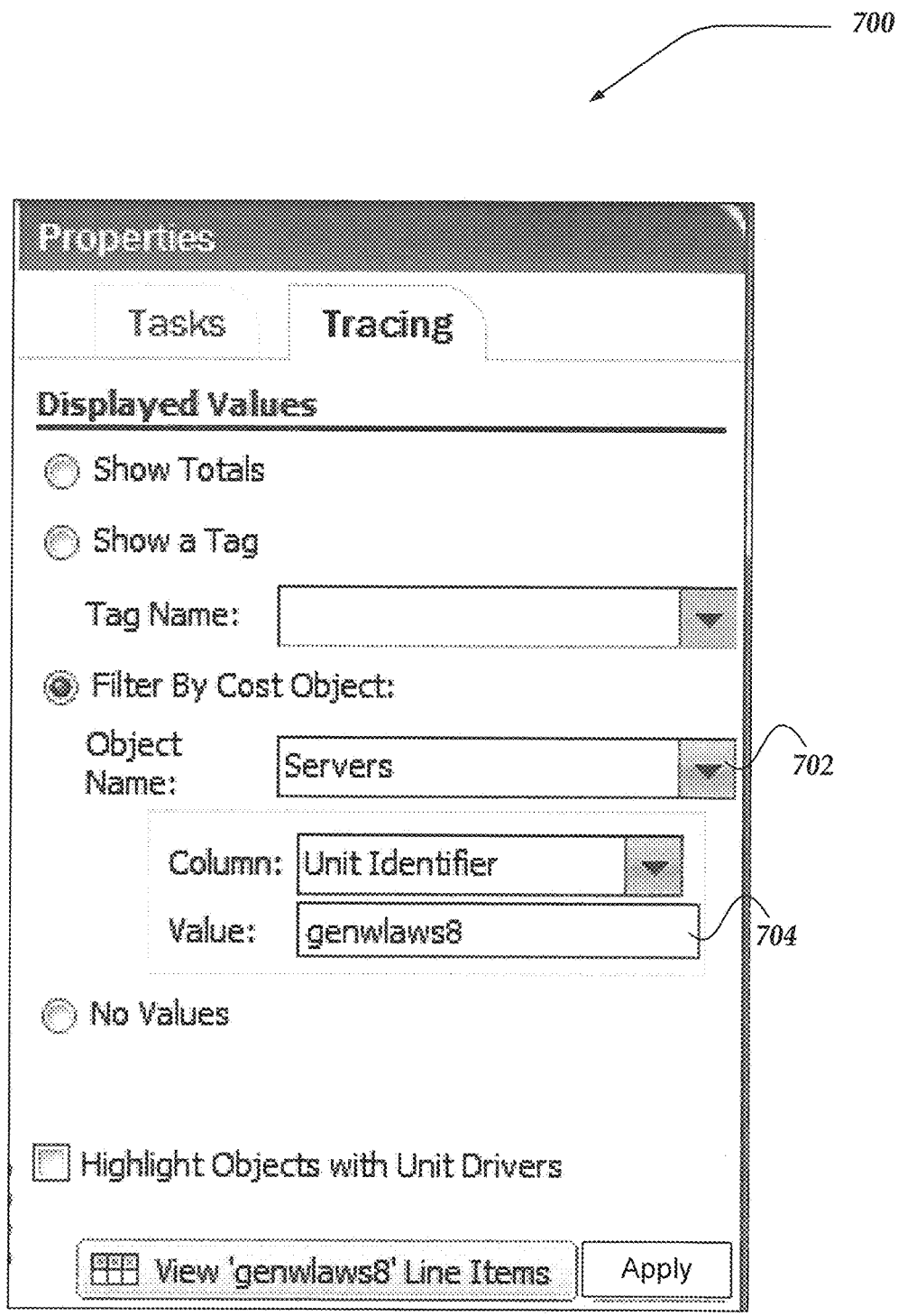
FIG. 7 illustrates an embodiment of a user-interface having a dialog box for selecting a cost line item from a cost object for generating a cost trace in accordance with the embodiments.

FIG. 7 illustrates an embodiment of a user-interface having dialog box 700 for selecting a cost line item from a cost object for generating a cost trace. In at least one of the various embodiments, the cost object for tracing may be picked from selection list 702. In at least one of the various embodiments, list 702 may include one or more cost objects that may be available for generating a cost trace. In at least one of the various embodiments, particular cost line items of interest may be selected, grouped, or identified using one or more properties of the cost object. For example, in one embodiment, dialog box 700 shows that the unit identifier for the cost object Servers may be used for filtering the cost line items for a cost trace. Further, value 704 may indicate the name of a server (e.g., genwlaws8) that may be traced. One of ordinary skill in the art will appreciate that a dialog box for selecting filters and cost line items for tracing may be arranged differently than the one depicted in FIG. 7. For example, in at least one of the various embodiments, additional selection fields may be available. Also, additional matching and/or filtering criteria may be available to the user. The embodiment in FIG. 7 may enable filter 704 to select cost line items based on equality. However, one or more embodiments may be arranged to provide additional matching rules such as Boolean algebra, less-than or greater-than style comparisons, custom formulas, custom scripts, or the like.

Figure 8:
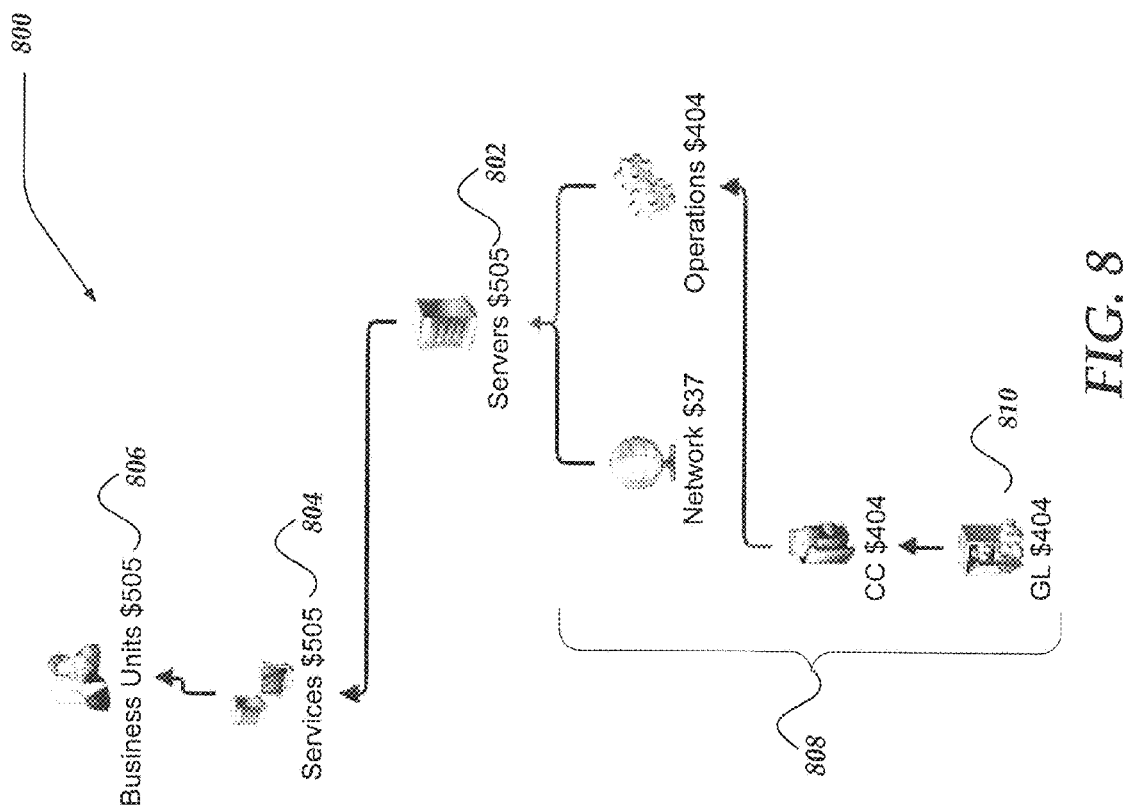
FIG. 8 shows an embodiment of a cost trace that may highlight costs and expenses allocated for a portion of the financial allocation model in accordance with the embodiments.

FIG. 8 shows an embodiment of a cost trace 800 that may highlight costs and expenses allocated for a portion of the financial allocation model. In at least one of the various embodiments. FIG. 8 shows fewer nodes and edges than are shown in FIG. 5. In at least one of the various embodiments, because FIG. 8 represents the cost trace of a subset of cost objects it may instead show the edges and nodes related to the cost objects that may be part of the cost trace. For example, in one embodiment, if a cost trace for cost line item identified as genwlaws8 (e.g., row 606 from table 600 in FIG. 6) may be generated, the nodes and edges related to the allocation rules associated with that cost line item may be made visible and provided to the user. Likewise, nodes and edges unrelated to the selected cost line item's allocation rules may be hidden from view.

In at least one of the various embodiments, a cost trace may show the distribution of the costs for cost object Servers 802 that may be allocated to cost object Services 804. Further, the costs of cost object Servers 802 may further be traced to cost object Business Units 806. For example, the $505 associated with the cost line item, genwlaw8 may be traced from cost object Services 804 and further traced from cost object Services 804 to cost object Business Units 806. In at least one of the various embodiments, this tracing through the cost objects that may be "above" the selected cost object (e.g., Servers 802) may display how the costs and expenses associated with Servers 802 may be allocated. In the embodiment illustrated in FIG. 8, the entire cost shown for Servers 802 may be allocated to Services 804 and subsequently allocated to Business Units 806.

In at least one of the various embodiments, a cost trace may be generated that shows the costs associated with cost objects "below" the selected cost object. Costs traced "downward" may show the sources of the costs for cost objects. In at least one of the various embodiments, in the cost objects 808 may represent the allocation of costs associated with cost object Servers 802. In at least one of the various embodiments, financial allocation models may include allocation rules that flow in additional directions, including left, right, up, down, or a combination thereof. Describing the cost object in terms of above or below a selected cost object should be considered non-limiting example used facilitate disclosure of at least one of the various embodiments.

In at least one of the various embodiments, for each cost object in the cost trace, the costs attributed and/or associated with selected cost object (e.g., the cost object that may be the subject of the cost trace) may be displayed as part of the visualization.

In at least one of the various embodiments, analysis of the financial allocation model may be improved because filtering cost traces to selected cost objects and/or cost line items may help a user identify how parts of the financial allocation model may be related and/or how the allocation rules may be operating. In at least one of the various embodiments, this visualization may enable a user to quickly assess if the financial allocation model has been designed correctly. In at least one of the various embodiments, visualizations of cost traces may enable users to demonstrate (to themselves and/or other users) the operation of particular allocation rules by way of a visualized graph. Such a demonstration may be a very natural mechanism for communicating these potentially very abstract concepts to other users. Visualization of cost traces may also dramatically enhance a user's ability to determine whether an allocation rule is working as intended. Cost traces may also help identify abnormal cost line items that may have fell between the cracks of the current allocation rules (e.g., where the corrective action may be to add or refine allocation rules).

In at least one of the various embodiments, the graphical user-interface remains interactive enabling the user to select cost object CL 810 to further show the CL cost line items that contribute to the $404 that may, be associated with Servers 802. In at least one of the embodiments, selecting cost object CL 810 may cause the user-interface to show the allocation table or list of cost line items to the user.

In at least one of the various embodiments, allocation rules may be arranged to directly add costs and/or expenses to a cost object. Such costs may represent an asset depreciation charge, initial starting value, or the like. In at least one of the various embodiments, an asset depreciation charge may account for why the $505 value of cost object Servers 802 may be more than the $404 showing at cost object CL 810.

Figure 9:
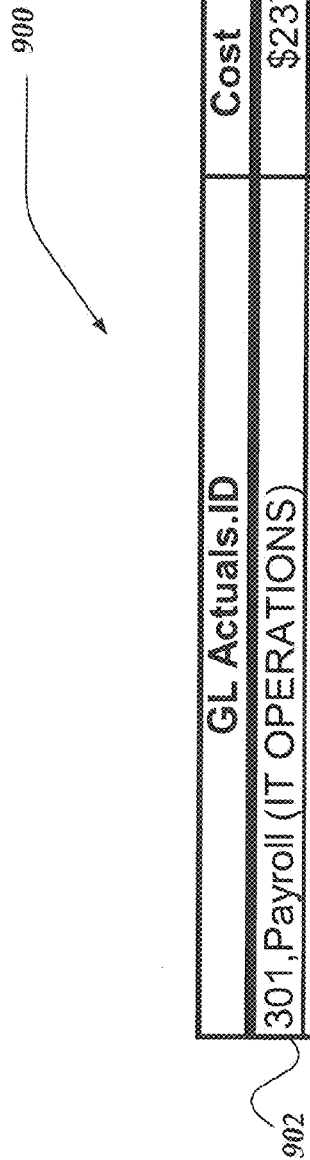
FIG. 9 depicts an allocation table that may include cost line items that may be associated and/or allocated to another cost object in accordance with the embodiments.

FIG. 9 depicts allocation table 900 that for at least one of the various embodiments may include the GL cost line items that may be associated and/or allocated to cost object Servers 802. In at least one of the various embodiments, the table may include just the items that may be traced to the server item genlwlaws8. In at least one of the various embodiments, row 902 may indicate that $273 of the $505 allocated to server genlwlaws8 may be associated with payroll costs (e.g., payroll for the employees that operate server genlwlaw8).

In at least one of the various embodiments, each cost object in the financial allocation model may be selected by a user using the user-interface. In at least one of the various embodiments, selecting a cost object may generate a detail view (drill-down view) showing the cost line items that may be associated with the selected cost object. In at least one of the various embodiments, if a cost trace may be active and displayed, the drill down view may include values for cost line items associated with the active cost trace filter(s). Also, in at least one of the various embodiments, cost line items showing in the drill-down view may correspond to the node and edges visible in the graphical visualization of the active cost trace (e.g., FIG. 8).

In at least one of the various embodiments, cost objects may include one or more cost line items that may be associated with the same cost object. In at least one of the various embodiments, users may select an entire cost object and generate a cost trace for all cost line items in the cost object at the same time. In at least one of the various embodiments, such a cost may trace how the aggregate cost of all the cost line items in the entire cost object flow through the financial allocation model.

Furthermore, in at least one of the various embodiments, a cost trace may be generated for a subset of the cost line items included in a cost object. In at least one of the various embodiments, a cost trace may be generated for budget lines items that may be selected and/or filtered by the user.

Figure 10:
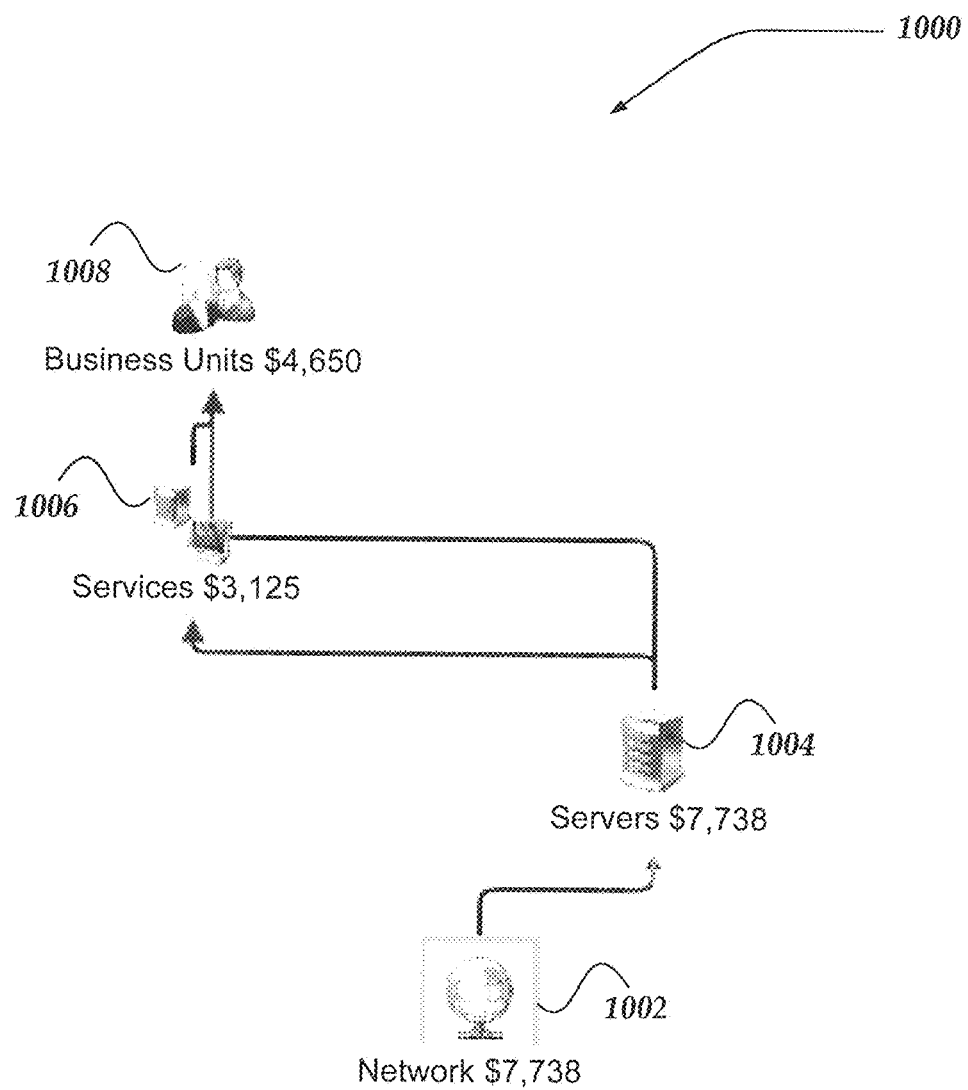
FIG. 10 illustrates a financial allocation model with a cost trace displaying how costs associated with a cost object may be allocated in the financial allocation model in accordance with the embodiments.

FIG. 10 illustrates an embodiment of a financial allocation model with cost trace 1000 displaying how costs associated with a cost object may be allocated in the financial allocation model. In at least one of the various embodiments, cost object Network 1002 may be selected by a user for cost tracing. In at least one of the various embodiments, cost trace 1000 may be generated based on the selection of cost object Network 1002 by the user. In at least one of the various embodiments, the cost trace may be visualized by displaying the nodes and edges of the financial allocation model that may be associated with the costs associated with the cost line items included in the cost object Network 1002.

For example, in at least one of the various embodiments, the cost of the cost line items included in cost object Network 1002 totals $7,738. Cost trace 1000 shows that cost object Network 1002 allocates 100% of its costs to cost object Servers 1004. In turn, costs from cost object Servers 1004 may be allocated to cost object Services 1006 and cost object Business Units 1008. In at least one of the various embodiments, cost trace 1000 may enable a user to gain an improved understanding of how the costs and/or expenses associated with cost object Network 1002 may flow through the financial allocation model. In at least one of the various embodiments, because cost object Network 1002 may be the subject of the cost trace, the cost object and allocations (e.g., edges) displayed may be those that may be associated and/or connected with cost object Network 1002. In at least one of the various embodiments, other cost objects may be hidden from view to highlight how the money associated with cost object Network 1002 flows through the financial allocation model.

Figure 11A:
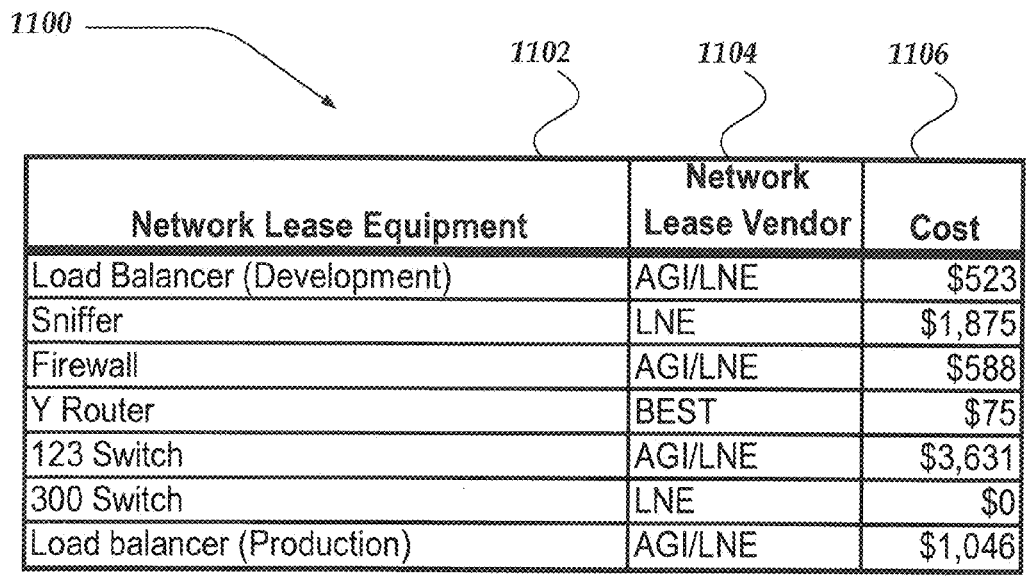
FIG. 11A illustrates a list that for at least one of the various embodiments may include the cost line items that may be associated and/or allocated to a cost object in accordance with the embodiments.

FIG. 11A illustrates list 1100 that for at least one of the various embodiments may include the cost line items that may be associated and/or allocated to cost object Network 1002. In at least one of the various embodiments, the list may include all of the cost line items that may be associated with cost object Network 1002. In at least one of the various embodiments, users may be enabled to cost trace subsets of a cost object's cost line items. In at least one of the various embodiments, users may be able to choose filtering and grouping rules using a dialog box similar to the dialog box in FIG. 7.

List 1100 shows cost line items, in at least one of the various embodiments, having three properties: name (identifier) 1102. Network Lease Vendor (vendor) 1104, and cost 1106. In at least one of the various embodiments, cost line items may have many properties in addition to those that may be reasonably displayed in a user-interface detail list. In at least one of the various embodiments, generally, users and systems administrator may define an arbitrary number of properties for cost line items.

In at least one of the various embodiments, the user-interface may enable a user to select and define the specific properties that may be display in various detail lists, in the non-limiting example shown in FIG. 11A, the system is configured to display name (identifier) 1102, Network Lease Vendor (vendor) 1104, and cost 1106. Other cost line items may be configured to display other properties. Also, it may be likely that some cost line items may include properties that do not exist for other cost line items. For example, having a vendor property may be appropriate for a cost object that includes network equipment, as illustrated by FIG. 11A. However, for a cost object that includes business units (e.g., Sales, Marketing, Engineering, or the like) as cost line items it may not be appropriate to include a vendor property.

In at least one of the various embodiments, the user-interface may enable a user to include cost object and/or cost line item properties in the displayed list. In at least one of the various embodiments, the additional properties may enable cost line items in a cost object to be filtered based on the properties. In at least one of the various embodiments, enabling filtering may be advantageous to the user because a cost object may be associated with a large number of cost line items. For example, a large company may have thousands of cost line items associated with a network cost object. Providing filtering based on the cost line item properties enables a user to conduct meaningful filtering and grouping of the cost line items.

In at least one of the various embodiments, filtering and grouping may be leveraged by cost tracing. In at least one of the various embodiments, users may generate a cost trace based on a set of cost line items from a cost object that may have been determined by using a filter. In at least one of the various embodiments, filters may include one or more properties as well as flexible comparison/matching techniques, including Boolean algebra, arithmetic comparisons (e.g., less-than, greater-than, or the like), programmatic expressions, or the like.

Figure 11B:
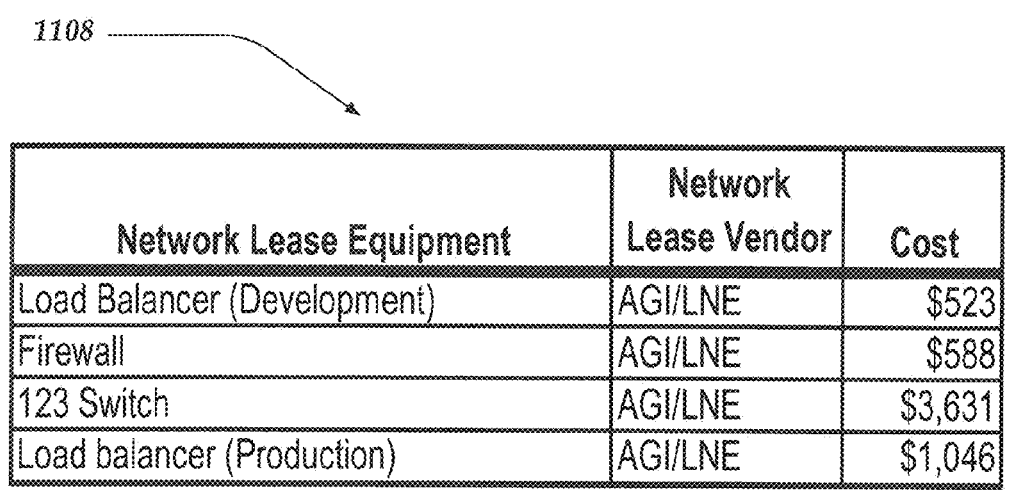
FIG. 11B illustrates a list that includes the results of filtering cost line items a filter rule in accordance with the embodiments.

FIG. 11B illustrates list 1108 that for at least one of the various embodiments may include the results of filtering cost line items using a simple filter rule requiring the Network Lease Vendor property to be equal to "AGI/LNE." In at least one of the various embodiments, as a result of applying the filter the cost line items displayed in list 1108 may be cost line items having the selected vendor value (AGI/LNE). In at least one of the various embodiments, this filtering enables the user to reduce the set of cost line items in the list.

In at least one of the various embodiments, the user may be enabled to generate cost tracing based on the filtered cost line items. Such a cost trace may trace how the costs and/or expenses associated with the filtered cost line items flow through the financial allocation model. In at least one of the various embodiments, the visualization of the cost trace may automatically be updated to display the effect of applying the filters to the cost trace.

Figure 12:
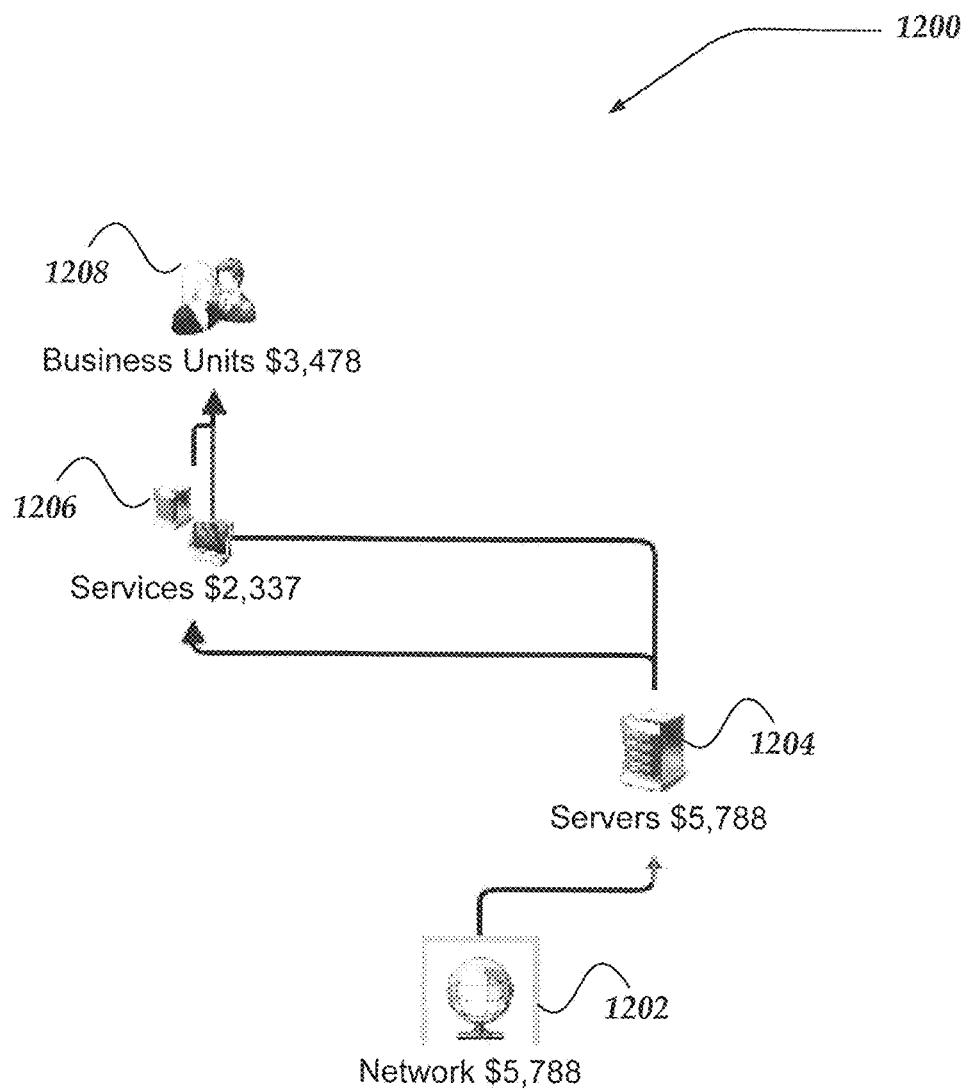
FIG. 12 illustrates a cost trace in accordance with the embodiments.

FIG. 12 illustrates cost trace 1200 that for at least one of the various embodiments that may correspond to list 1102 of FIG. 11B. In this non-limiting example, comparing cost trace 1200 with cost trace 1000 shows the nodes and edges that may be equivalent but the cost allocations associated with the edges are different. The values shown on cost trace 1200 reflect that the cost trace represents a subset of the cost line items included in cost object Network 1202.

In at least one of the various embodiments, another mechanism for generating a cost trace may be to "tag" cost objects and/or cost line items with an identifier. In at least one of the various embodiments, an element in the financial allocation model may be tagged by associating one or more tags with the element. In at least one of the various embodiments, tags may be named and defined as required by the user. Tags may enable additional tracing, filtering, grouping, or the like. For example, in one embodiment, a tag of "Fixed" may be created and associated with one or more cost objects that the user defines as being fixed costs. In at least one of the various embodiments, additional tags such as "Variable" and "Direct" may be generated and associated with one or more cost objects. In at least one of the various embodiments, multiple tags may be associated with one or more cost objects.

Figure 13:
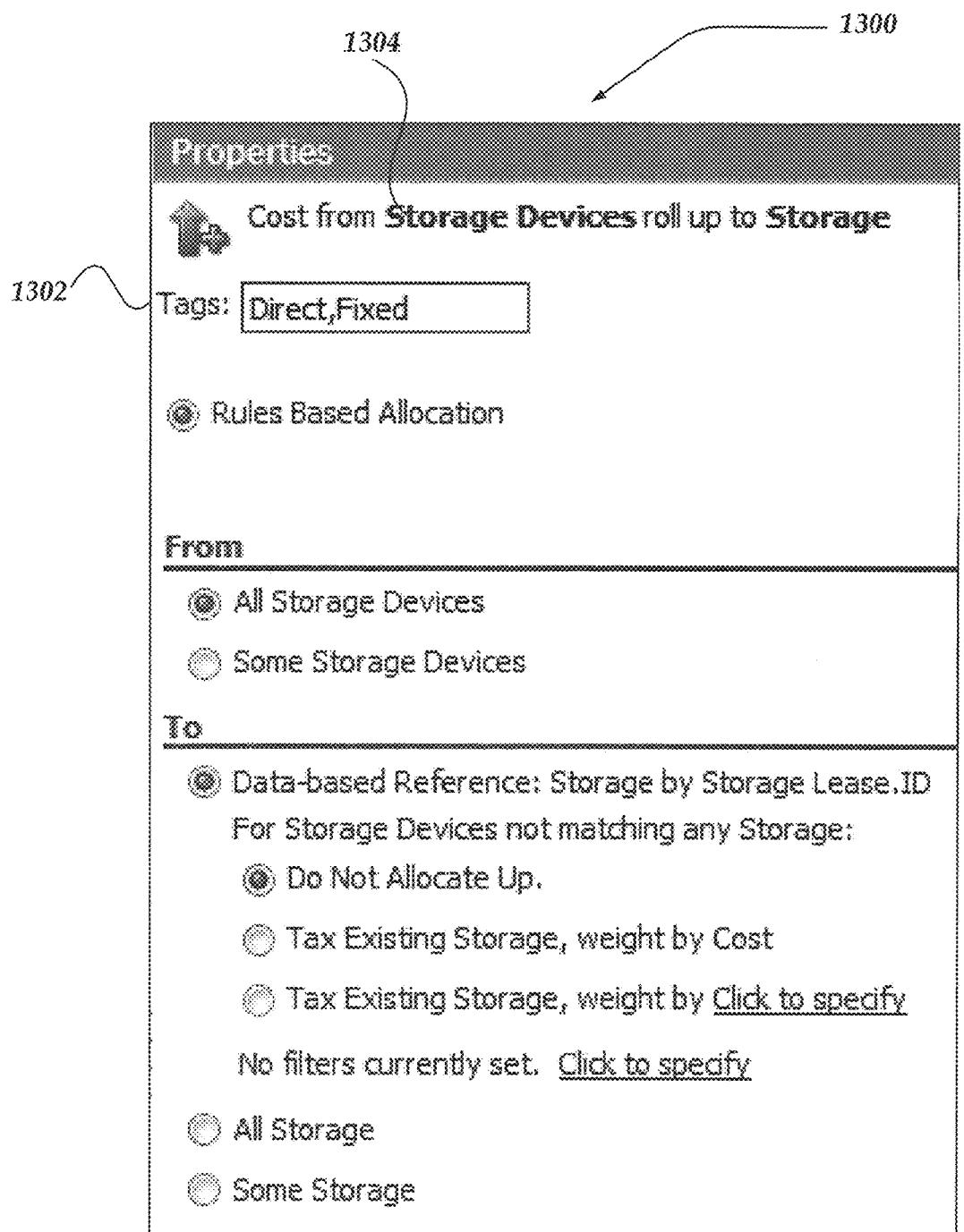
FIG. 13 shows a dialog box that may be used for generating and associating tags with cost object in accordance with the embodiments.

FIG. 13 shows dialog box 1300 that for at least one of the various embodiments may be used for generating and associating tags with cost objects. In at least one of the various embodiments, tags (e.g., "Direct" and "Fixed") may be entered in tag field 1302 to generate and/or associate tags with a cost object. In one embodiment, multiple tags may be generated and/or associated by entering multiple values separated by a comma. In at least one of the various embodiments, the tags in tag field 1302 may be associated with the cost object identified by label 1304. In the non-limiting example shown in FIG. 13, label 1304 may indicate that the tags in field 1302 may be associated with the cost object Storage Devices.

In at least one of the various embodiments, if the values entered in field 1302 may be unknown to the system, new tags may be generated by the system. In one embodiment, the names for new and/or generated tags may be the displayed in field 1302.

In at least one of the various embodiments, tag names may be pre-defined and made available to a user with a user-interface such as a selection list, dropdown list, radio button group, checkboxes, or the like. Further, in at least one of various embodiments, tags may be defined and/or associated with cost objects based on configuration files, pre-loaded database tables, configuration tables stored on remote servers, or the like.

In at least one of the various embodiments, a tag may linked to a cost object by storing the tags in the data fields, associating the tags with the cost object using a database for mapping the tags to the cost objects, or the like.

In at least one of the various embodiments, a cost trace may be generated based on the costs associated with tagged cost objects. In at least one of the various embodiments, the tags may act as a filter so that the cost trace reflects the cost and expenses of cost object(s) having the selected tag(s).

Figure 14:
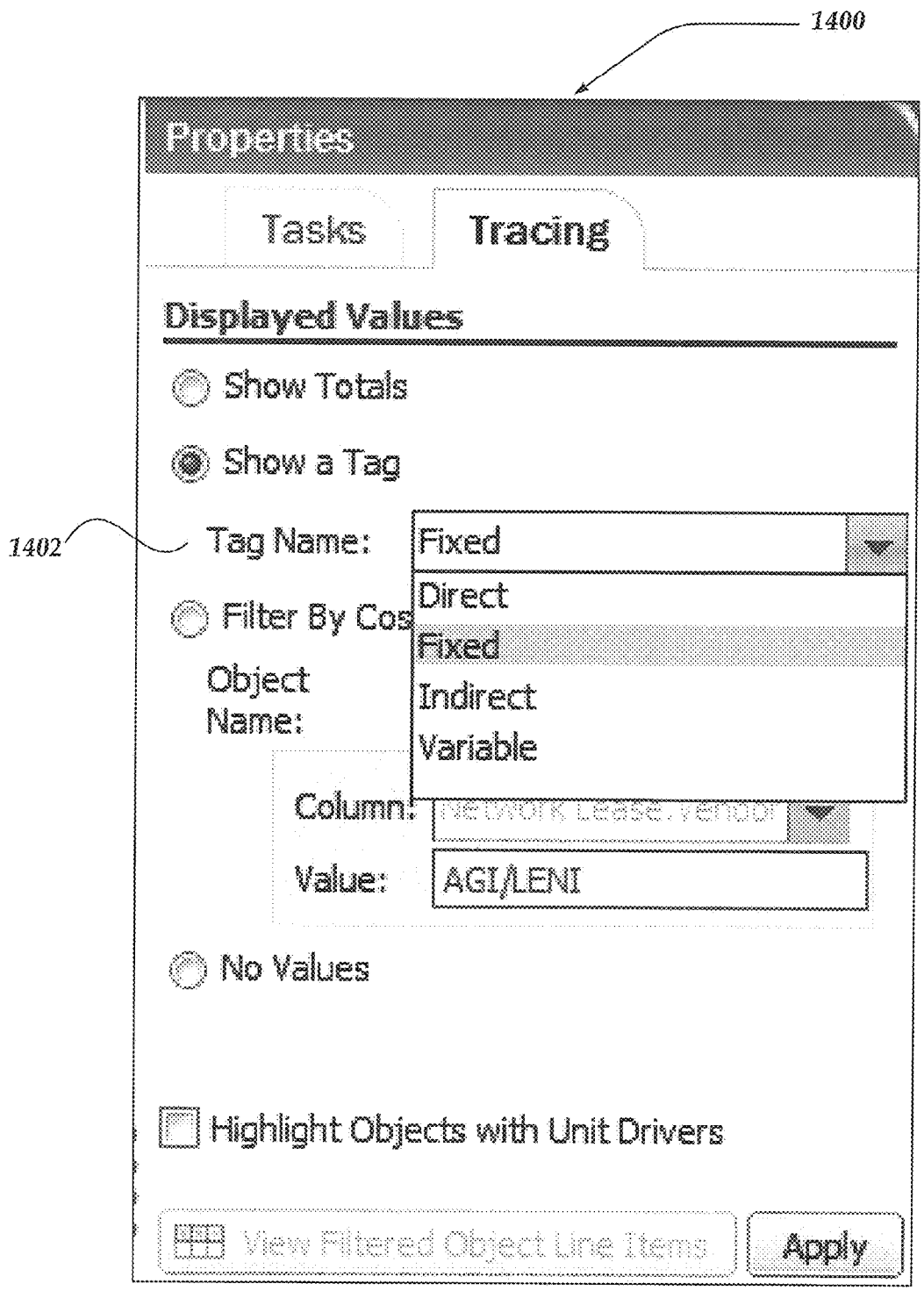
FIG. 14 shows a dialog box that may be used for generating a cost trace based on tags associated with cost object in accordance with the embodiments.

FIG. 14 shows dialog box 1400 that for at least one of the various embodiments may be used for generating a cost trace based on tags associated with cost object. In at least one of the various embodiments, a user may select a tag from selection list 1402 to initiate a cost trace for the costs of cost object(s) that may be associated with the tag. In the non-limiting example shown in FIG. 14, select list 1402 may display all of the tags available in the system. In at least one of the various embodiments, the displayed tags may be filtered based on the context of the currently selected cost object(s), user permissions, or the like.

In at least one of the various embodiments, additional fields may be included on dialog box 1400 that may enable tags to be selected, filtered and/or searched using additional techniques including, type-ahead text search, wildcards, conditional operations (e.g., all tags having more than 'X' associated cost objects, new tags, old tags, or the like), Boolean algebra, or the like.

Figure 15:
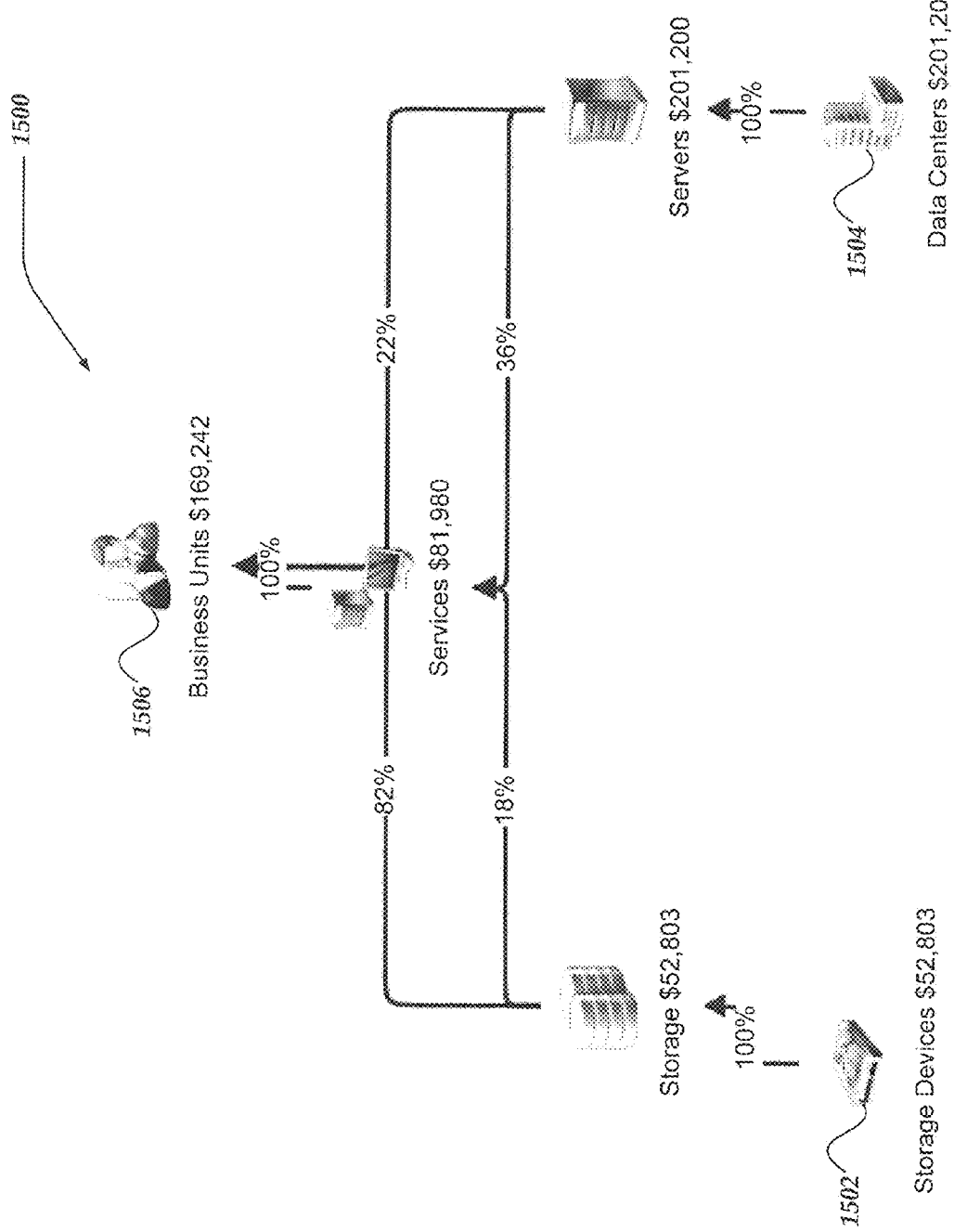
FIG. 15 shows a trace view that may show a tracing based on selected tags in accordance with the embodiments.

FIG. 15 shows cost trace 1500 that for at least one of the various embodiments shows costs traced based on selected tags. In at least one of the various embodiments, a cost trace based on tags may trace cost allocations from more than one cost object. In the non-limiting example depicted by FIG. 15, cost trace 1500 illustrates a cost trace of allocation from cost object Storage Devices 1502 and cost object Data Centers 1504 to cost object Business Units 1506. In at least one of the various embodiments, multiple cost objects appear as source cost objects because they may be associated with the same tags. Other cost objects appearing in the cost trace may be part of the cost trace because one or more object having the relevant associated tags (e.g., cost object Storage Devices 1502 and cost object Data. Centers 1504).

Figure 16A:
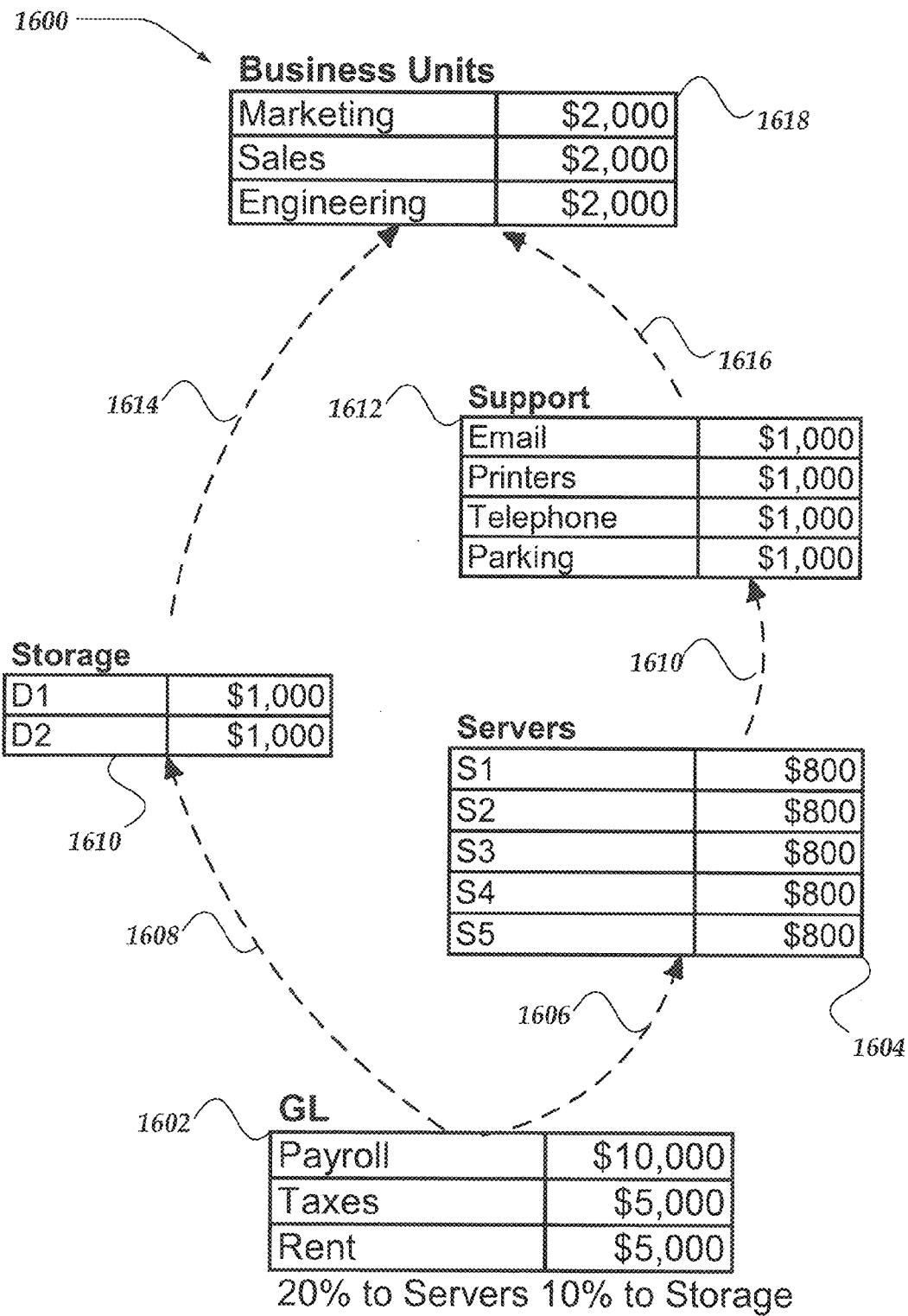

FIG. 16A illustrates a financial allocation model that may be used support additional description of the systems and methods enabled by at least one of the various embodiments.

In at least one of the various embodiments, the financial allocation model illustrated by FIG. 16A may have five cost objects: cost object GL 1602, cost object Servers 1604, cost object Storage 1610, cost object Support 1612, and cost object Business Units 1616. In at least one of the various embodiments, each cost object contains a set of cost line items. For example, cost object GL 1602 includes cost line items for Payroll, Taxes and Rent. Likewise, cost object Support 1612 includes cost line items Email, Printers, Telephone, and Parking. In at least one of the various embodiments, each cost line item has one or more associated cost values. For example, cost object Storage 1610 has two cost line items, D1 and D2 (e.g., disk drives) having associated cost values of $1000 each.

Connecting the cost objects of the model may be allocation rules. In at least one of the various embodiments, allocation rules may show how money flows between the cost objects. Resulting in a graph where the cost object may be represented as nodes and the allocation rules may be represented as edges. In at least one of the various embodiments, generally a financial allocation model may be represented by a directed acyclic graph but that is not a requirement for an operative financial allocation model. In at least one of the various embodiments, a financial allocation model graph may contain cycles that are resolved or estimated using mathematical techniques, including but not limited to Gaussian elimination, Cholesky decomposition or Newton's method.

In at least one of the various embodiments, allocation rule 1606 represents a rule allocating 20% of the money in cost object GL 1602 to cost object Servers 1604. In this example, cost object GL 1602 includes a total of $20,000, thus 20% of $20,000 (e.g., $4,000) flows to cost object Servers 1606. Likewise, allocation rule 1608 may allocate $2,000 from cost object GL 1602 to cost object Storage 1610. The other allocation rules in FIG. 16A allocate 100% of the money to the next cost object: allocation rule 1610 directs 100% of the money (e.g., $4,000) to flow to cost object Support 1612; allocation rule 1616 directs 100% of the money in cost object Support (e.g., $4,000) to flow to cost object Business Units 1616; and allocation rule 1614 directs 100% of the money from cost object Storage 1610 to flow to cost object Business Units 1618.

In at least one of the various embodiments, money that flows into the cost object may be allocated among the included cost line items. In at least one of the various embodiments, each cost object may have one or more rules that may describe the assignment ratios for how the money in a cost object may assigned to cost line items. For the cost objects 1604, 1610, 1612, and 1618, simple rules assign the money in the cost object evenly among the cost line items. Cost object GL 1602 may have different assignment ratios, in this non-limiting example, the assignment ratio between the cost line items may be 50% to Payroll, 25% to Taxes, and 25% to Rent.

In at least one of the various embodiments, an assignment ratio may represent how the money in an actual budget may be assigned to the actual cost line items. In at least one of the various embodiments, rules may be applied that distribute the money based on formulas that may be defined by the users or administrators who designed the financial allocation model. In at least one of the various embodiments, the assignment ratios and allocations may be modified as part of the financial allocation modeling process.

The example financial allocation model in FIG. 16A may be a simplified model useful for facilitating discussion and understanding of the embodiments, since allocation rules for financial allocation models of large commercial entities can be numerous and complex. However, the financial allocation model disclosed in FIGS. 16A-E is at least sufficient to enable one of ordinary skill in the art to practice what is claimed herein.

FIG. 16B shows a portion of the financial allocation model and allocations for illustrating a walkthrough of a cost trace on the financial allocation model shown in FIG. 16A. In at least one of the various embodiments, generating a cost may be divided into at least processing the cost object "below" the cost object selected for tracing and the cost objects "above" the cost object selected for tracing. FIG. 16B illustrates performing the cost trace operations on the cost objects that may be "below" the selected cost object. One of ordinary skill in the art will appreciate that the terms "above" and "below" as used herein have been chosen for convenience to facilitate description of at least one of the various embodiments. As used herein "above" and "below" refer to the direction the money flows relative to a cost object. In at least one of the various embodiments, money in a financial allocation model may flow in any direction depending on how the allocation rules may be arranged. In at least one of the various embodiments, cost objects may receive money from cost objects above, below, left, right, or a combination thereof.

In this example, the selected cost object is cost object Support 1612 (from FIG. 16A). Thus, in at least one of the various embodiments, cost object Servers 1604 and cost object GL 1602 may be identified as being "below" the selected cost object. In at least one of the various embodiments, cost object Storage 1610 may be categorized as "unrelated" because it may not be related or connected to the cost object being traced.

In this non-limiting example, for at least one of the various embodiments, two cost line items, Email and Printers, from the cost object Support 1620 may be traced. In at least one of the various embodiments, among other things, such a cost trace may enable the user to visualize how the money related to Email support and Printer support flows through the financial allocation model. In at least one of the various embodiments, the cost line items for tracing may be identified by the user selecting the particular cost line items of interest or by applying a filter, in at least one of the various embodiments, for this example (as shown in FIGS. 16B and 16C) how, or why, the items were identified for cost tracing may be less pertinent.

In at least one of the various embodiments, intermediate allocation table 1620 may be generated by filtering cost object Support 1612 to include the cost line items of interest, in this example, "Email" and "Printers." Intermediate allocation table 1622 includes cost value from table 1620 allocated to cost object Servers 1604. Because the assignment ratios for cost object Server 1604 may be defined as even/equal distribution, the costs for the cost line items from table 1620 may be evenly distributed across the cost line items (e.g., different servers) in table 1622. In at least one of the various embodiments, allocation rules and assignment ratios may be different from those illustrated in the simplified financial allocation model used in FIG. 16A. For example, if S1 was defined as the dedicated email server and S2 was a dedicated printer server, servers S3-S5 may not share and/or participate in the costs for the Email and Printers cost line items from table 1620.

In at least one of the various embodiments, 100% of the costs of cost object Servers 1604 may be allocated to cost object Support 1612. Here the costs for two cost line items (Email and Printers) of cost object Support 1620 are being traced backwards to determine how the costs allocated to Email and Printers may be allocated at cost object Servers 1604. Intermediate allocation table 1622 may be generated to represent the allocation of the costs of Email and Printers as may be related the cost object Servers.

In at least one of the various embodiments, an intermediate allocation table may be generated by applying the assignment ratio associated with the cost object. In this case the cost object Server 1604 evenly shares the costs of the Email and Printers so the costs may be allocated as 20% per server for each cost line item (e.g., $200). In more complex (realistic) financial allocation models the assignment ratios may be different for each item.

Intermediate allocation table 1624 may be collapsed from allocation table 1622. In at least one of the various embodiments, collapsing the table prepares it for tracing down to the next level of cost objects. In at least one of the various embodiments, the generation of expanded intermediate allocation table 1622 captures the individual variation in allocation rules and/or assignment ratios that may be associated with each cost line item. In at least one of the various embodiments, the allocation rules and/or assignment ratios for cost line items may be varied and complex. Thus, in at least one of the various embodiments, building the intermediate allocations by applying the allocation rules to each individual cost line item may be critical to maintaining accuracy and consistency in the cost trace.

In at least one of the various embodiments, intermediate allocation table 1626 shows the allocation of the values in table 1624 to the cost object GL 1602. In at least one of the various embodiments, the assignment ratios from cost object GL 1602 may be applied resulting in each cost line item in table 1642 (e.g., each server) having $200 that may be allocated to Payroll, $100 that may be allocated to Taxes, and $100 that may be allocated to Rent.

In at least one of the various embodiments, intermediate allocation table 1628 may be generated by collapsing table 1626. In at least one of the various embodiments, this may complete the cost trace calculations for the cost objects in financial allocation model 1600 that may be "below" the cost object that may have been selected for cost tracing. In at least one of the various embodiments, this may mark the completion of at least one part of the cost trace.

FIG. 16C illustrates at least one of the various embodiments for performing cost trace processing on cost objects that may be "above" the cost object selected for cost tracing. Intermediate allocation table 1630 may include the cost line items that may be traced, "Email" and "Printers" from cost object Support 1612 (FIG. 16A). In at least one of the various embodiments, intermediate allocation table 1632 may be generated by applying the assignment ratios and rules for cost object Business Units 1618 on the items from table 1630. In at least one of the various embodiments, intermediate allocation table 1634 may be the collapsed version of table 1632.

Figure 16D:
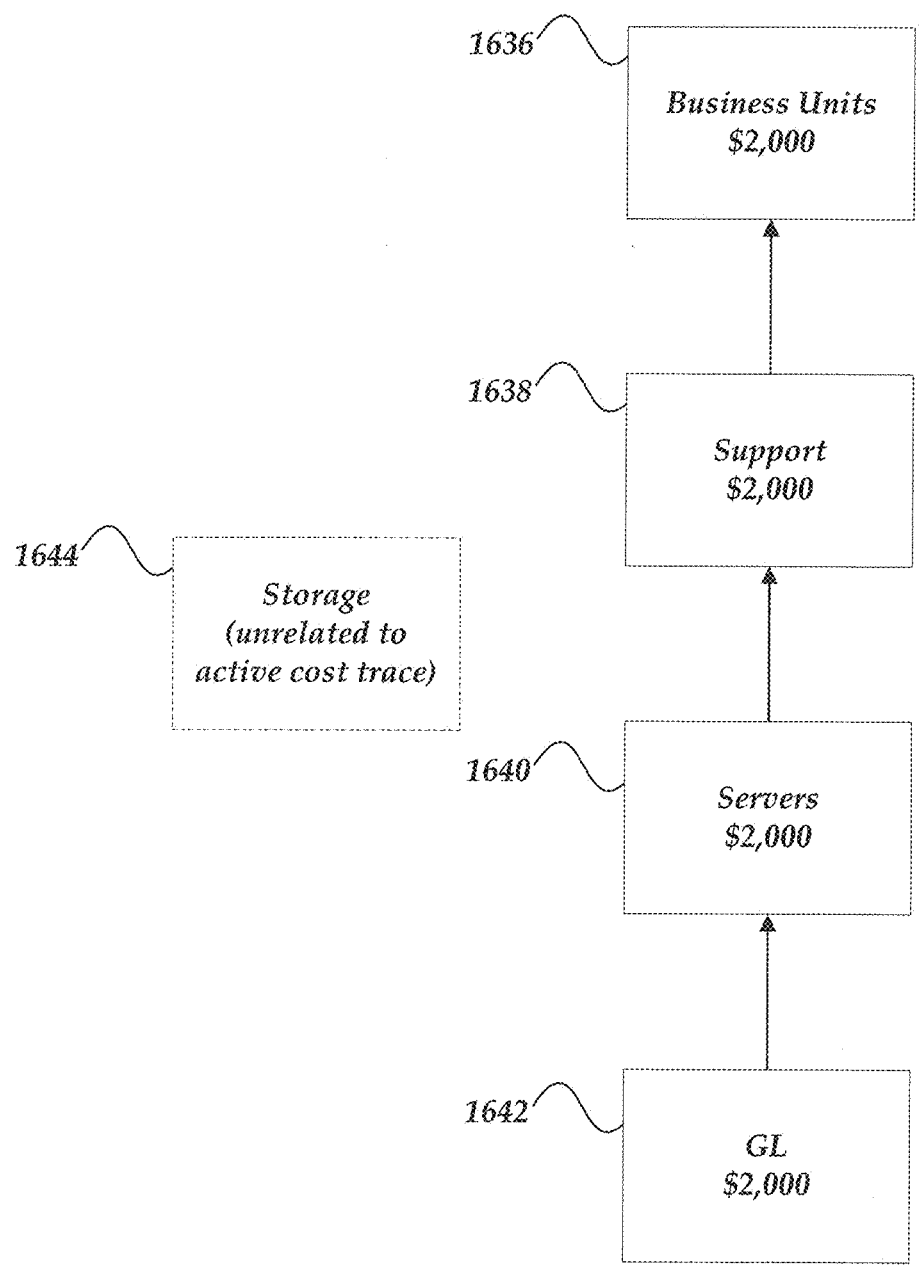

FIG. 16D shows a simplified view for at least one of the various embodiments, of the cost trace illustrated by FIGS. 16A, 16B, and 16C. In at least one of the various embodiments, after a cost trace is completed, the cost objects related to the cost trace may be visualized by displaying the cost object and at least the summary cost values that are determined based on the cost trace processing. For the non-limiting example shown in FIGS. 16A-16C, cost object Business Units 1636 shows $2,000 based on the cost trace, cost object Support 1638 shows $2,000 based on the cost trace, cost object Servers 1640 shows $2,000 based on the cost trace, cost object GL 1642 shows $2,000 based on the cost trace, and cost object Storage 1644 may be shown as unrelated to the cost trace. Because as shown in FIG. 16A, for at least one of the various embodiments, cost object Storage 1610 may not be associated and/or connected to the cost object Support 1612.

FIG. 16E illustrates for at least one of the various embodiments, intermediate allocation tables and a cross reference table that may be generated by simultaneously generating cost traces. This non-limiting example is based on the financial allocation model shown in FIG. 16A. In at least one of the various embodiments, a cross reference table 1656 may be generated to efficiently compare how costs in a budget may be allocated for multiple cost line items. For example, cross reference table 1656 may show how money from the cost line items of cost object Business Units 1618 relate to the cost line item in cost object GL 1602.

In at least one of the various embodiments, intermediate allocation table 1646 may be generated by merging the allocation table for cost object Servers with the cost object GL 1602. In at least one of the various embodiments, merging of the allocation tables may require expanding the cell in one table with a cell from another table based on the allocation rules and/or assignment ratios. For example, intermediate allocation table 1646 may be generated by determining how the money allocated from cost object GL 1602 may be allocated to the cost object Servers 1604. In this example, $4,000 may be allocated from cost object GL 1602 to cost object Servers 1604 by application of allocation rule 1606. In this model it may result in an allocation of $800 per server (S1-S5). Substituting this information back into cost object GL's 1602 allocation table may result in intermediate allocation table 1646. Note, that the money allocated to cost object Servers 1604 has been captured in intermediate allocation table 1646.

Likewise, in at least one of the various embodiments, intermediate allocation table 1648 may be generated by merging the allocation table for cost object Servers 1606 with the allocation table for cost object Support 1612. In at least one of the various embodiments, intermediate allocation table 1650 may be generated by merging the allocation table for cost object Business Units 1618 with the allocation table for cost object Support 1612.

Continuing, the intermediate allocation tables 1648 and 1650 may be merged resulting in intermediate allocation table 1652. And, intermediate allocation table 1654 may be generated by merging intermediate allocation table 1646 and 1652. In at least one of the various embodiments, allocation table 1654 may demonstrate the details of how, not including cost object Storage 1610, the money allocated to cost object Business Units 1618 that may trace back to the cost object GL 1602. In this example, cost object Storage 1610 may be a related and/or relevant cost object because according to financial allocation model 1600 it may connect with cost object GL 1602 and cost object Business Units 1618.

In at least one of the various embodiments, a similar intermediate allocation table generation and merging process may be applied for cost object Storage 1610. In at least one of the various embodiments, this may result in an intermediate allocation table (not shown) similar to intermediate allocation table 1654, accumulating the money related to cost object Storage. In at least one of the various embodiments, such a table may have the same columns and rows with cost values different from intermediate allocation table 1654. In at least one of the various embodiments, intermediate allocation tables generated based on branches in the underlying financial allocation model may be added together to generate a final cross-reference table such as table 1656. In at least one of the various embodiments, referring to FIG. 16A confirms that all the money from cost object GL 1602 may be accounted for in the cross-reference table 1656 (e.g., $6,000 from cost object GL was allocated in financial allocation model 1600 and all $6,000 is accounted for in cross-reference table 1656).

In at least one of the various embodiments, financial allocation models may have hundreds or thousands of cost objects with individual cost objects including millions of cost line items. In at least one of the various embodiments, the generation of many of the intermediate allocation tables may be independent thus in many cases parallel processing techniques may be leveraged to improve performance.

Also, in at least one of the various embodiments, a cross reference table may be generated by generating individual cost traces employing methods as described in conjunction with FIG. 16A-16D for each cost line item of interest.

Generalized Operation

Figure 17:
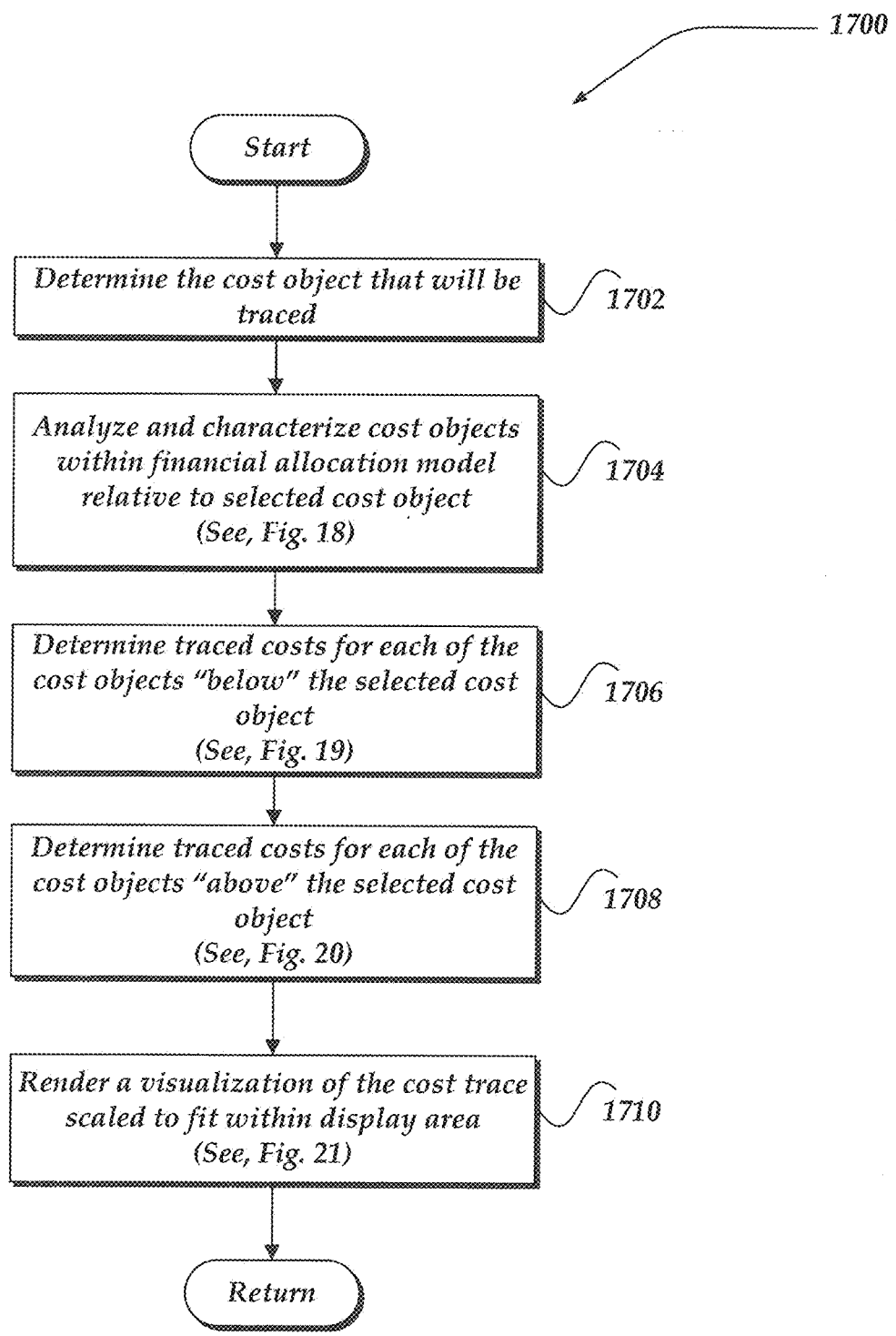
FIG. 17 shows a flowchart for a process for generating a cost trace in accordance with the embodiments.

FIG. 17 shows a flowchart for process 1700 for at least one of the various embodiments for generating a cost trace. After a start block, at block 1702, determine the one or more cost objects that may be traced. In at least one of the various embodiments, a user may select one or more cost objects displayed on a user-interface. Also, in at least one of the various embodiments, a user may select cost objects based on filters, tags, formulas, or the like.

Next, at block 1704 the cost object included in the financial allocation model may be analyzed and characterized relative to the selected cost object(s). In at least one of the various embodiments, the financial allocation model may be processed to determine the set of cost objects that may be relevant to the cost trace. In at least one of the various embodiments, the financial allocation model graph may be traversed starting the selected cost object to identify "connecting" cost objects.

In at least one of the various embodiments, multiple and/or parallel graph traversals may be enabled. For example, in at least one of the various embodiments, one process may traverse a financial allocation model "upwards" from the selected cost object. And, in at least one of the various embodiments, another process may traverse the financial allocation model "downward."

Next at block 1706, for each cost object determined to be "below" the selected cost object, costs are calculated that may be traced to the selected cost object.

Next at block 1708, for each cost object determined to be "above" the select cost object, costs are calculated that may be traced to the selected cost object.

Next at block 1710, a visualization is rendered for the cost trace within the financial allocation model. After the cost trace is visualized, control may return to the calling process.

Figure 18:
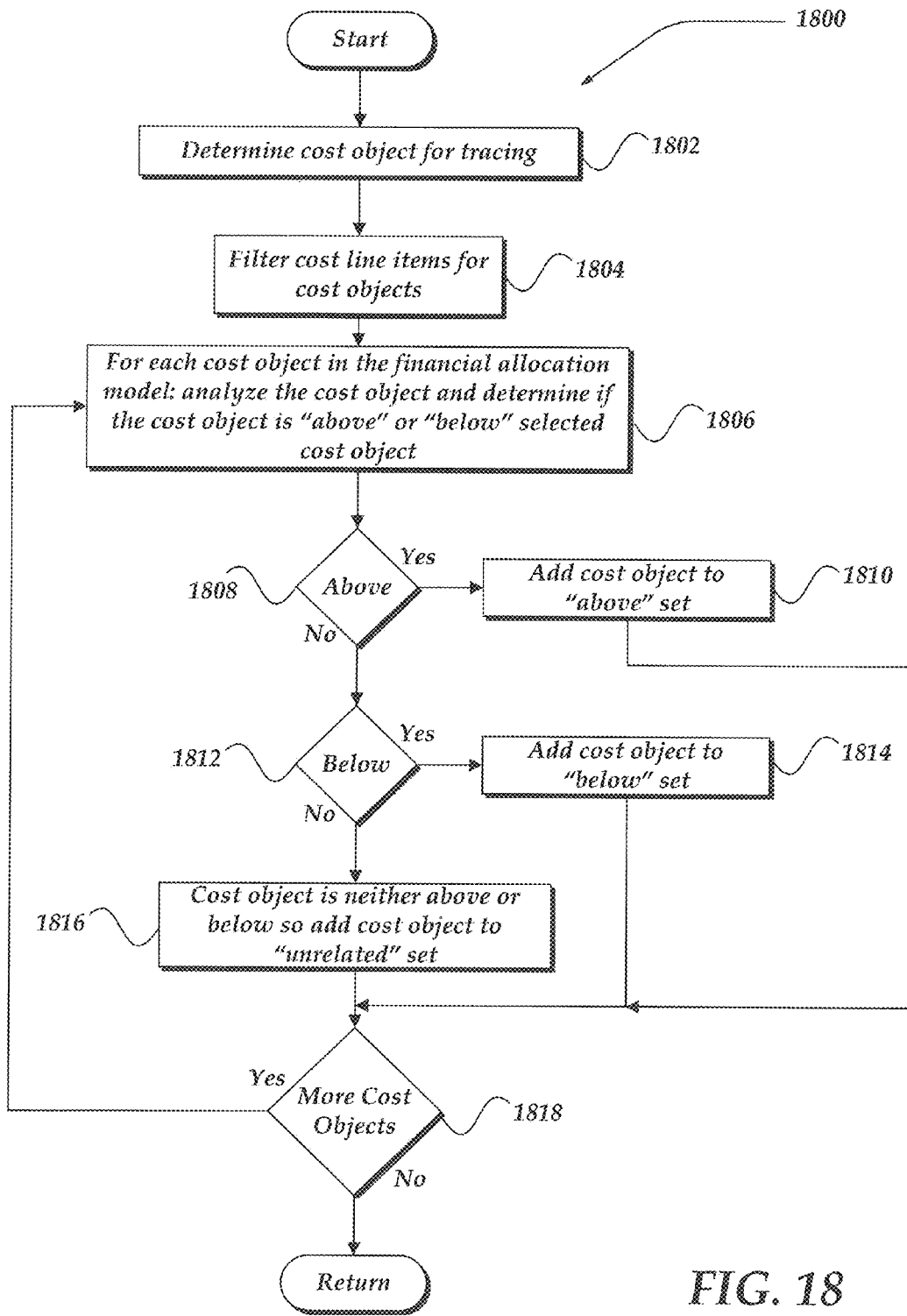
FIG. 18 shows a flowchart of a process for characterizing cost objects in a financial allocation model relative the selected cost object in accordance with the embodiments.

FIG. 18 shows a flowchart of process 1800 for at least one of the various embodiments for characterizing cost objects in a financial allocation model relative the selected cost object. After a start block, at block 1802, the cost object for tracing may be determined. Next at block 1804, the cost line items in the selected cost object may be reduced by applying associated filters to the selected cost objects allocation table. In at least one of the various embodiments, the remaining cost line items may be the source of cost allocation for the cost trace. For example, intermediate allocation table 1620 shows at least one of the various embodiments of a filtered allocation table for cost object 1612.

Next at block 1806, each cost object in the financial allocation model may be analyzed to determine if the cost object is "above" or "below" the cost object that may have been selected for tracing. In at least one of the various embodiments, the financial allocation model may be scanned in one or more directions by applying one or more graph traversal algorithms.

At decision block 1808, in at least one of the various embodiments, if a cost object may be determined to be above the cost object selected for tracing, control may move to block 1810. Otherwise, in at least one of the various embodiments, control may more to block 1812. At block 1810 the cost object may be associated with the "above" set. Next from block 1810 control may move to decision block 1818.

At decision 1812, in at least one of the various embodiments, if a cost object may be determined to be below the cost object selected for tracing, control may move to block 1814. Otherwise, in at least one of the various embodiments, control may move to block 1816.

At block 1814, the cost object may be associated with the "below" set and then control may move to decision block 1818.

At block 1816, in at least one of the various embodiments, if the cost object may be determined to be neither above nor below the cost object that has been selected for tracing, this cost object may be added to the "unrelated" set of cost objects. In at least one of the various embodiments, a cost object that may be determined to be unrelated may be absent from the remaining cost trace processing. However, in at least one of the various embodiments, in the visualization process an unrelated cost object may be rendered to indicate that they may be unrelated to the cost trace.

At decision block 1818 in at least one of the various embodiments, if there may be more cost objects to analyze, control may loop back to block 1806. Otherwise control may be returned to a calling process.

Figure 19:
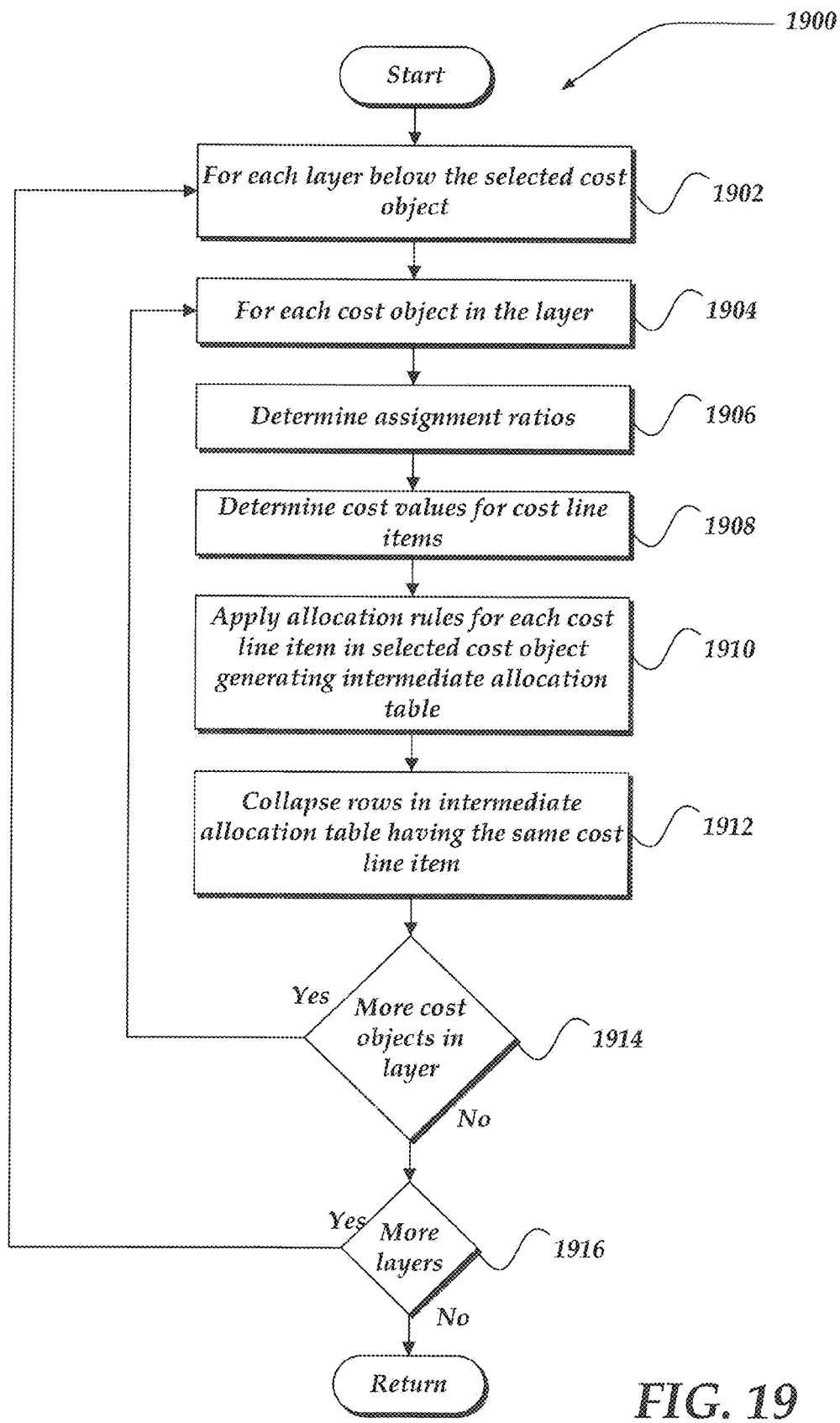
FIG. 19 shows a flowchart of a process for processing cost objects below a selected cost object in accordance with the embodiments.

FIG. 19 shows a flowchart of process 1900 for at least one of the various embodiments for processing cost objects below a selected cost object. After a start block, at block 1902, processing of the financial allocation model begins starting with the layer immediately below the selected cost object. In at least one of the various embodiments, the layer immediately below the selected cost object may include one or more cost objects that allocate money to the selected cost object. Referring to the financial allocation model embodiments in FIG. 8, if cost object Servers 802 is the selected cost object, cost object Network and cost object Operations may be considered to be on the layer below the selected cost object. Likewise, cost object Services 804 may be considered to be on the layer above the selected cost object 802. Referring to financial allocation model 1600 depicted in FIG. 16A, relative to cost object Business Units 1618, cost object Storage 1610 and cost object Support 1612 may be considered to be on the same layer that may be "below" cost object Business Units 1612. However, in at least one of the various embodiments, relative to cost object Support 1612, cost object Storage 1610 and cost object Servers may be consider to be on separate layers. But, "looking" upwards from cost object GL 1602, cost object Storage 1610 and cost object Servers 1604 may be considered to be on the same layer above cost object GL 1602. In at least one of the various embodiments, this may be because cost objects that may have at least one allocation rule that connects to the same cost object (above or below) may be considered to be part of the same layer.

Next at block 1904, in at least one of the various embodiments, processing begins for each cost object in the financial allocation model layer that may be currently undergoing processing. In at least one of the various embodiments, filters may be active on an intermediate cost object being processed. If so the cost line items and allocation rules may require filtering. In at least one of the various embodiments, if additional pre-tracing formulas and/or rules may be associated with the cost object they may also be applied.

Next at block 1906, determine the allocation rules and/or assignment ratios for the cost object currently being processed. In at least one of the various embodiments, assignment ratios may be based on allocations rules. For example, an allocation rule may require 10% of money allocated to the cost object to be applied to a particular cost line item. In at least one of the various embodiments, financial allocation model 1600 defines the assignment ratio for cost object Servers 1604 as an even distribution with 20% of money allocated to each server. Also, in financial allocation model 1600, cost object GL 1602 shows an asymmetrically distributed assignment ratio of 50% for Payroll, 25% for Taxes, and 25% for Rent. In at least one of the various embodiments, assignment ratios may reflect how the money in the financial allocation model may be distributed among cost line item in a cost object.

Next at block 1908, determine cost values for cost line items for the cost object currently being processed. In at least one of the various embodiments, the costs for the cost line items that may be applied may be determined. For example, referring to FIG. 16B, before generating intermediate allocation table 1622, the cost values for Email and Printer was determined to be $1000 respectively.

Next at block 1910, apply allocation rules and/or assignment ratios for each cost line item to generate an intermediate allocation table. In at least one of the various embodiments, for each cost line item in the cost object currently being processed apply the cost values determined from the cost objects above the cost object currently being processed. In at least one of the various embodiments, if the layer currently being processed may be directly below the selected cost object, these costs may be coming from the selected cost object's allocation table. Otherwise in at least one of the various embodiments, the costs may be derived from upstream processing. For example, the cost allocations used to generate intermediate allocation table 1622 may originate from the selected cost object (cost object Servers 1620). The cost allocated to form intermediate allocation table 1626 may come from the costs in intermediate allocation table 1624.

Next at block 1912, collapse rows in the generated intermediate allocation table that may have the same cost line item. In at least one of the various embodiments, during processing it may be required to process each allocated cost line item individually against each cost line item in the cost object currently being processed. In at least one of the various embodiments, one reason for this requirement may be to capture the allocation rules that may be assigned at an individual cost line item. In at least one of the various embodiments, after the allocation has been made, the intermediate allocation table may be collapsed in preparation for propagating the traced costs to the next layer of cost objects in the financial allocation model. See. FIG. 16B.

Next, at decision block 1914, if more cost object in the current financial allocation model layer require processing, control may loop back to block 1904. Otherwise, control may move to decision block 1916.

Next at decision block 1916, if more financial allocation model layers require processing, control may loop back to block 1902. Otherwise, control may be returned to the calling process.

Figure 20:
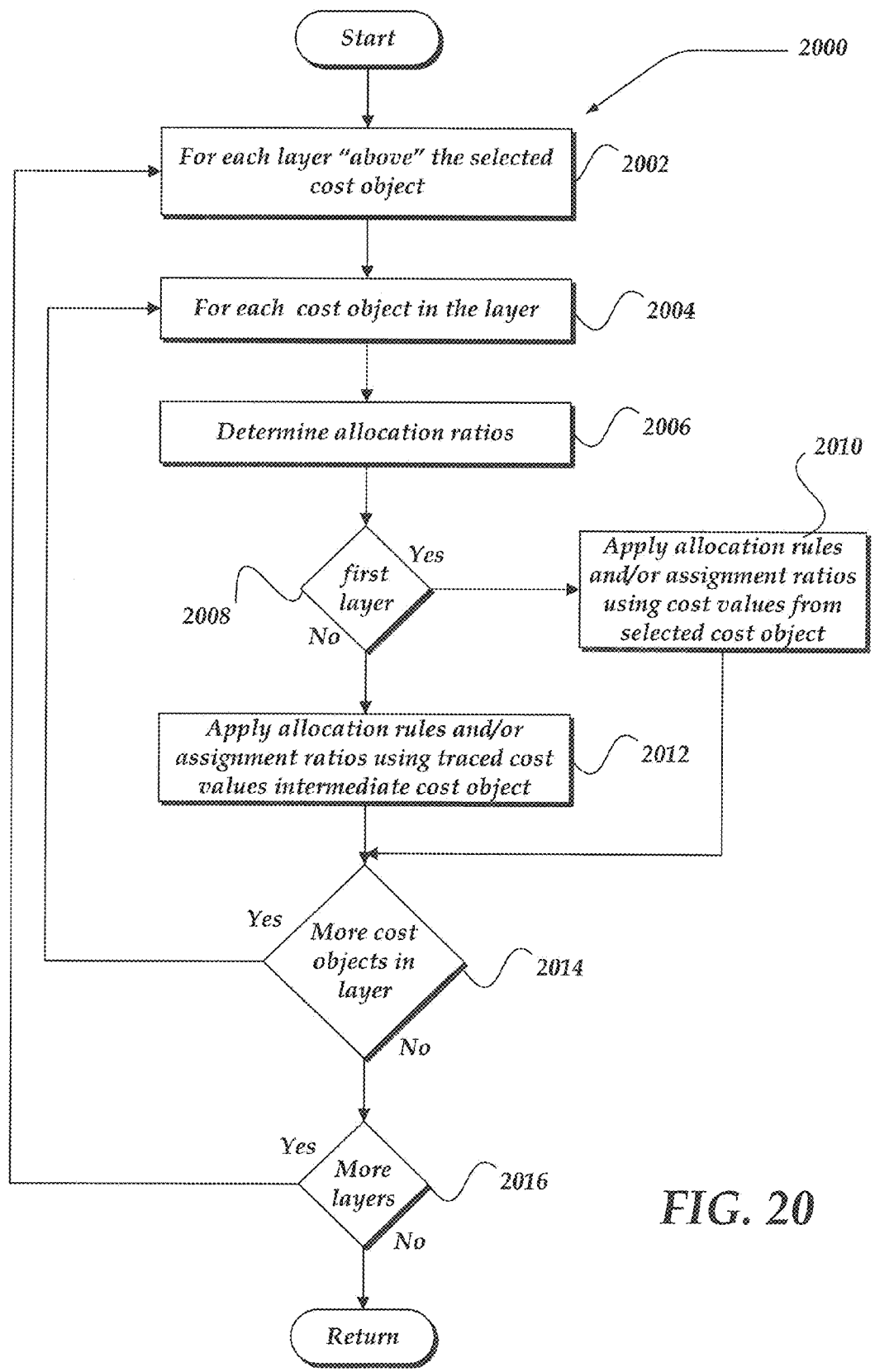
FIG. 20 shows a flowchart of a process for generating cost trace calculations for cost objects above the selected cost object in accordance with the embodiments.

FIG. 20 shows a flowchart of process 2000 for at least one of the various embodiments for generating cost trace calculations for cost objects "above" the selected cost object. After a start block, at block 2002, processing begins of the first layer of cost objects above the selected cost object.

Next at block 2004, processing begins for the cost objects in the current financial allocation model layer.

Next at block 2006, determine the allocation rules and/or assignment ratios for the relevant cost line items in the cost object currently being processed.

Next at decision block 2008, if the current cost object being processed may be in the first layer (e.g., the layer directly above the cost object was selected for cost tracing) control may move to block 2010. Otherwise, control may move to block 2012.

At block 2010, in at least one of the various embodiments, apply the allocation rules and/or assignment ratios of the cost object currently being processed using the cost values from the selected cost object (e.g., the cost object that is the subject of the cost trace in the first place).

At block 2012, in at least one of the various embodiments, apply allocation rules and/or assignment ratios using traced cost values from one or more intermediate cost objects that may be part of the previous layer. In at least one of the various embodiments, process 2000 may be traversing up the layers of the financial allocation model. In at least one of the various embodiments, traced costs computed below may be applied to the layers above.

Next at decision block 2014, if there may be cost objects remaining to be processed in the current financial allocation model layer, control may loop to block 2004. Otherwise, control may move to decision block 2016.

At decision block 2016, if more layers above the selected cost object require processing, control may loop back to block 2002. Otherwise control may be returned to the calling process.

Figure 21:
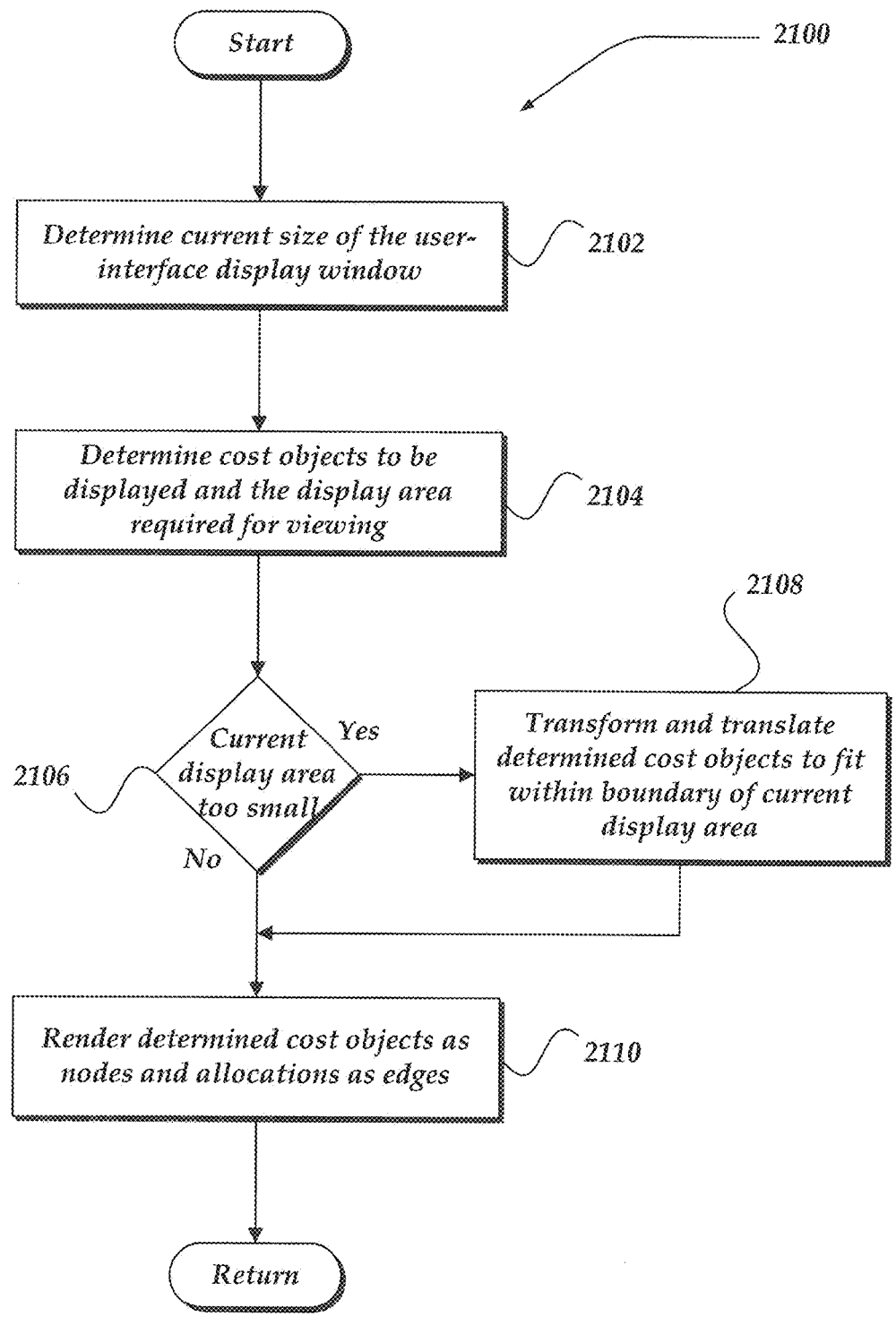
FIG. 21 shows a flowchart of a process for rendering a visualization of a cost trace of cost objects in a financial allocation model in accordance with the embodiments.

FIG. 21 shows a flowchart of process 2100 for at least one of the various embodiments for rendering a visualization of a cost trace of cost objects in a financial allocation model. After a start block, at block 2102, determine the effective size of the current display area of the user-interface. Next at block 2104, determine the set of cost objects to be displayed for visualizing the cost trace. In at least one of the various embodiments, based at least on the set of cost objects that are to be displayed, determine the display area required for visualizing the cost trace. In at least one of the various embodiments, the budget and forecasting system may be configured to arrange the nodes and edges of the using a "best-fit" process that lays out the graphical elements for improved readability and eye-appeal. In at least one of the various embodiments, for large financial allocation models a user may be able to only view a portion of the financial allocation model at any one time based on the effective display area that may be available.

In at least one of the various embodiments, the layout for displaying the financial allocation model cost trace may be calculated using the same "best-fit" process as used to display the financial allocation model absent an active cost trace. In at least one of the various embodiments, if the current effective display area may accommodate the visualization of the cost trace it may remain undisturbed. In at least one of the various embodiments, this may reduce user discomfort by avoiding unnecessary resealing and resizing of the visualization after each a cost trace.

Next at decision block 2106, in at least one of the various embodiments, if the current display area is not able to accommodate the cost trace visualization, control may move to block 2108. Otherwise, control may move to block 2110.

At block 2108, in at least one of the various embodiments, transforming and translating is performed for the determined cost objects to enable the cost trace visualization to be displayed in the current display area. In at least one of the various embodiments, if a cost trace includes cost objects that may be spread too far apart in the financial allocation model graph for the normal layout engine to render an adequate view using the current display area, the layout may adjusted. In at least one of the various embodiments, intervening cost objects that may be unrelated to the cost trace may be culled from the view. Further, in another embodiment, the lengths of the edges between relevant cost objects may be reduced. Also, in at least one of the various embodiments, the center-point of the display area may be translated to focus on the "center-of-mass" of the current cost-trace.

Next at block 2110, generate a visualization of the cost trace and render onto the display. In at least one of the various embodiments, the cost trace visualization may be generated to enable a user to immediately appreciation how the cost objects in the cost trace relate to each other and to the financial allocation model. See, FIG. 8 and FIG. 16D. Next control may be returned to the calling process.

Figure 22:
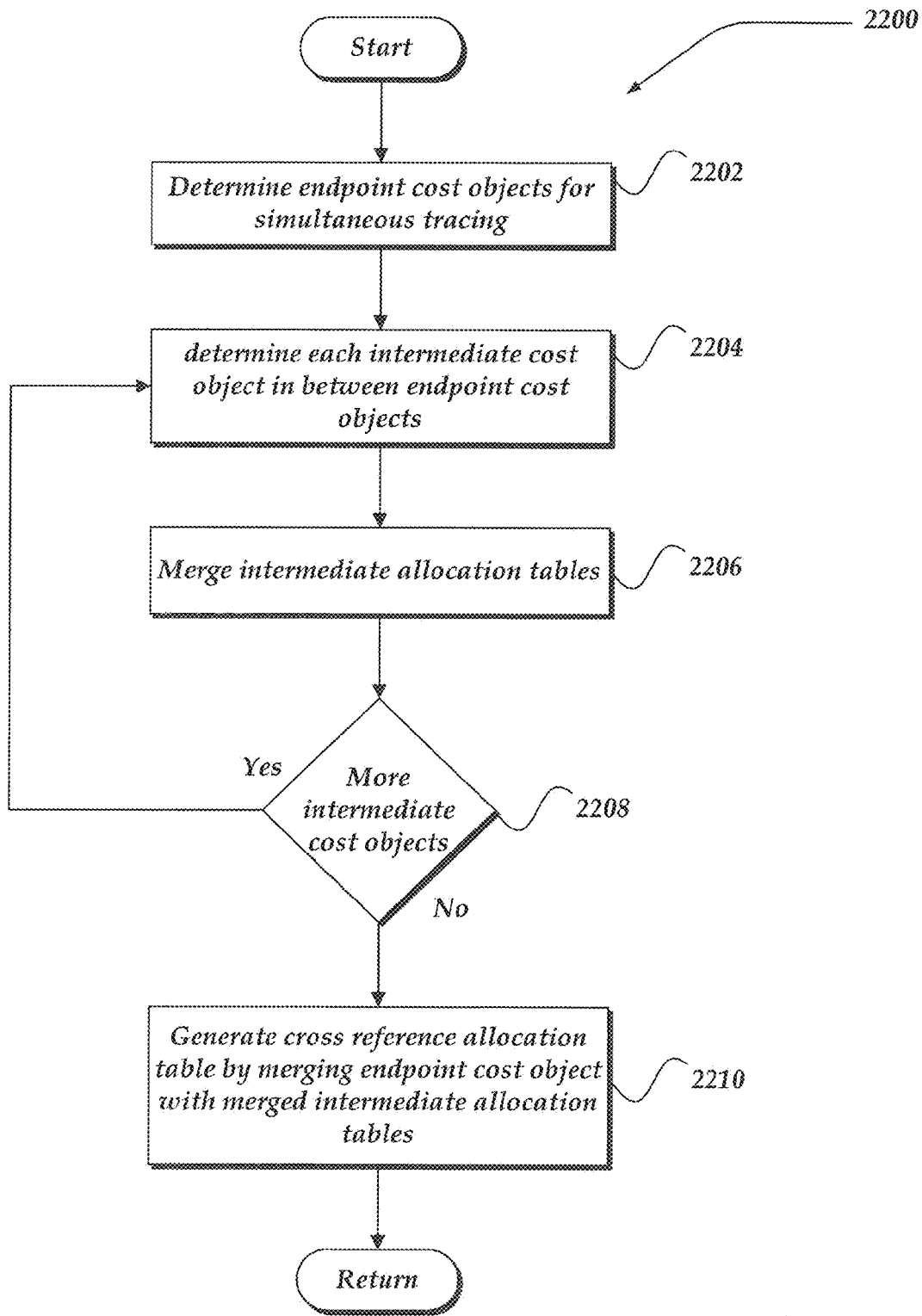
FIG. 22 shows a flowchart of a process for simultaneous cost tracing to generate cross reference allocation tables in accordance with the embodiments.

FIG. 22 shows a flowchart of process 2200 for at least one of the various embodiments for simultaneous cost tracing to generate cross reference allocation tables. After a start block, at block 2202, determine the endpoint cost objects for simultaneous cost tracing. In at least one of the various embodiments, simultaneous cost tracing may be used to generate cross reference tables involving multiple cost objects. In at least one of the various embodiments, if generating a cross reference allocation table, a user may choose one or more end point cost objects that may be cross referenced. In the non-limiting example shown in FIG. 16E, cost object Business Units 1618 and cost object GL 1602 were chosen as endpoints.

Next at block 2204, determine each intermediate cost object in between the endpoint cost objects. In at least one of the various embodiments, the financial allocation model may be traversed to identify the cost objects that require processing. In at least one of the various embodiments, all of the cost objects that require processing may be identified before beginning to process these cost objects. In at least one of the various embodiments, identifying the cost objects before processing may enable heuristics to be applied to identify opportunities for increased performance based on how the allocation tables may be merged.

Next at block 2206 in at least one of the various embodiments, identify and merge intermediate allocation tables. In at least one of the various embodiments, as described above in conjunction with FIG. 16E, cost object allocation tables may be merged to create intermediate allocation tables using the determined allocation rules and/or assignment ratios and substitution.

At decision block 2208, if more intermediate cost objects require processing, control may loop back to block 2204. Otherwise, control may move to block 2210.

At block 2210, generate the cross reference allocation table by merging the intermediate allocation tables into the endpoint cost object allocation table.

In at least one of the various embodiments, it is also possible to merge in either direction (e.g., up or down). Also, in at least one of the various embodiments, generation of intermediate tables and subsequent merging may use starting points on the different parts of the financial allocation model graph. In at least one of the various embodiments, a combination of these techniques (up/down/inside) may be used to improve computing performance and efficiency.

In at least one of the various embodiments, there may several heuristic techniques that may be applied to determine the optimal merge order. In at least one of the various embodiments, down sampling the number of rows in subsequent tables may improve efficiency. For example, if a financial allocation model has allocation tables having 5, 30,000, 10,000, and 10 cost line items respectively, it may generally be faster to merge 5 against 30,000, 10 against 10,000, and then have a single large merge of those combined tables together.

Also, in at least one of the various embodiments, it may be possible to merge different parts of the path in parallel. For example, a computer may be able merge Business Units into Support on one CPU core, and GL into Servers on another CPU core.

In at least one of the various embodiments, if a model has a branch in the middle, or a "Y" shape, merging from the bottom up may facilitate re-use of the merged allocation tables. In at least one of the various embodiments, if every merge is top-down, any work done merging cost object GL into the end point table may not be re-used for other paths or future simultaneous traces because it may apply to just the exact path that was used. In at least one of the various embodiments, this may also apply to simultaneous traces that are expected to re-filter the results in different ways. In at least one of the various embodiments, in a top-down merge approach intermediate results may not be cached to reduce work for future simultaneous cost traces.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for tracing costs for a plurality of cost objects with a network device that is operative to perform actions, comprising:
   determining at least one of the plurality of cost objects that are displayed to a user, wherein the determination is based at least in part on a selection of the at least one cost object by the user;
   determining a financial allocation model for the plurality of cost objects, wherein a path in the financial allocation model is characterized by a selection of at least a starting point of at least one cost object and an endpoint of at least one other cost object in the financial allocation model,
   characterizing the other cost objects as one of above, below, and unrelated to the at least one determined cost object;
   generating a first traced cost in the financial allocation model if any of the other cost objects are determined to be below the at least one determined cost object;
   generating a second traced cost in the financial allocation model if any of the other cost objects are determined to be above the at least one determined cost object; and
   displaying a total traced cost for at least one of the other cost objects related to the at least one cost object, wherein the total traced cost includes at least each of the first traced costs and each of the second traced costs.

2. The method of claim 1, wherein each of the plurality of cost objects includes at least one cost line item that are selectively filterable for accumulation in the total traced cost.

3. The method of claim 1, wherein determining the at least one cost object further comprises employing data collected by a dialog box for at least one property.

4. The method of claim 1, wherein displaying the total cost trace further comprises:
   determining each cost object having one of the first traced costs and the second traced costs;
   determining at least a portion of a display that is available;
   displaying the selected at least one cost object and each cost object having one of the first traced costs and the second traced costs in the determined portion of the available display; and
   displaying a visualization of at least one allocation rule that corresponds to each cost object that is displayed in the determined portion of the available display.

5. The method of claim 1 further comprising:
   determining at least one intermediate cost object that is on the path characterized by the start point and the endpoint, wherein each intermediate cost object includes an allocation table;
   merging each allocation table for each intermediate cost object on the path in the financial allocation model; and
   generating a cross reference allocation table for the at least one other cost object that is characterized by the end point, wherein the cross reference allocation table is based on a merger of the merged intermediate allocation tables with each allocation table for the at least one other cost object.

6. A system that is operative to trace costs for a plurality of cost objects over a network, comprising:
   a server device, including:
      a transceiver that is operative to communicate over the network;
      a memory that is operative to store at least instructions; and
      a processor device that is operative to execute instructions that enable actions, including:
         determining at least one of the plurality of cost objects that are displayed to a user, wherein the determination is based at least in part on a selection of the at least one cost object by the user;
         determining a financial allocation model for the plurality of cost objects, wherein a path in the financial allocation model is characterized by a selection of at least a starting point of at least one cost object and an endpoint of at least one other cost object in the financial allocation model;
         characterizing the other cost objects as one of above, below, and unrelated to the at least one determined cost object;
         generating a first traced cost in the financial allocation model if any of the other cost objects are determined to be below the at least one determined cost object;
         generating a second traced cost in the financial allocation model if any of the other cost objects are determined to be above the at least one determined cost object; and
   a client device, comprising:

a transceiver that is operative to communicate over the network;

a memory that is operative to store at least instructions; and a processor device that is operative to execute instructions that enable actions, including displaying a total traced cost for the at least one of the other cost objects related to the at least one cost object, wherein the total traced cost includes at least each of the first traced costs and each of the second traced costs.

7. The system of claim 6, wherein each of the plurality of cost objects includes at least one cost line item that are selectively filterable for accumulation in the total traced cost.

8. The system of claim 6, wherein determining the at least one cost object further comprises employing data collected by a dialog box for at least one property.

9. The system of claim 6, wherein displaying the total cost trace further comprises:
determining each cost object having one of the first traced costs and the second traced costs;
determining at least a portion of a display that is available;
displaying the selected at least one object and each cost object having one of the first traced costs and the second traced costs in the determined portion of the available display; and
displaying a visualization of at least one allocation rule that corresponds to each cost object that is displayed in the determined portion of the available display.

10. The system of claim 6, wherein the server device enables further actions comprising:
determining at least one intermediate cost object that is on the path characterized by the start point and the endpoint, wherein each intermediate cost object includes an allocation table;
merging each allocation table for each intermediate cost object on the path in the financial allocation model; and
generating a cross reference allocation table for the at least one other cost object that is characterized by the end point, wherein the cross reference allocation table is based on a merger of the merged intermediate allocation tables with each allocation table for the at least one other cost object.

11. A network device that is operative to trace costs for a plurality of cost objects comprising:
a transceiver that is operative to communicate over a network;
a memory that is operative to store at least instructions; and
a processor device that is operative to execute instructions that enable actions, including:
determining at least one of the plurality of cost objects that are displayed to a user, wherein the determination is based at least in part on a selection of the at least one cost object by the user;
determining a financial allocation model for the plurality of cost objects, wherein a path in the financial allocation model is characterized by a selection of at least a starting point of at least one cost object and an endpoint of at least one other cost object in the financial allocation model;
characterizing the other cost objects as one of above, below, and unrelated to the at least one determined cost object;
generating a first traced cost in the financial allocation model if any of the other cost objects are determined to be below the at least one determined cost object;
generating a second traced cost in the financial allocation model if any of the other cost objects are determined to be above the at least one determined cost object; and
displaying a total traced cost for at least one of the other cost objects related to the at least one cost object, wherein the total traced cost includes at least each of the first traced costs and each of the second traced costs.

12. The network device of claim 11, wherein each of the plurality of cost objects includes at least one cost line item that is selectively filterable for accumulation in the total traced cost.

13. The network device of claim 11, wherein determining the at least one cost object further comprises employing data collected by a dialog box for at least one property.

14. The network device of claim 11, wherein displaying the total cost trace further comprises:
determining each cost object having one of the first traced costs and the second traced costs;
determining at least a portion of a display that is available;
displaying the selected at least one object and each cost object having one of the first traced costs and the second traced costs in the determined portion of the available display; and
displaying a visualization of at least one allocation rule that corresponds to each cost object that is displayed in the determined portion of the available display.

15. The network device of claim 11, wherein the server device enables further actions comprising:
determining at least one intermediate cost object that is on the path characterized by the start point and the endpoint, wherein each intermediate cost object includes an allocation table;
merging each allocation table for each intermediate cost object on the path in the financial allocation model; and
generating a cross reference allocation table for the at least one other cost object that is characterized by the end point, wherein the cross reference allocation table is based on a merger of the merged intermediate allocation tables with each allocation table for the at least one other cost object.

16. A processor readable non-transitive storage media that includes instructions for tracing costs for a plurality of cost objects, wherein execution of the instructions by a processor device enables actions, comprising:
determining at least one of the plurality of cost objects that are displayed to a user, wherein the determination is based at least in part on a selection of the at least one cost object by the user;
determining a financial allocation model for the plurality of cost objects, wherein a path in the financial allocation model is characterized by a selection of at least a starting point of at least one cost object and an endpoint of at least one other cost object in the financial allocation model;
characterizing the other cost objects as one of above, below, and unrelated to the at least one determined cost object;
generating a first traced cost in the financial allocation model if any of the other cost objects are determined to be below the at least one determined cost object;
generating a second traced cost in the financial allocation model if any of the other cost objects are determined to be above the at least one determined cost object; and
displaying a total traced cost for at least one of the other cost objects related to the at least one cost object, wherein the total traced cost includes at least each of the first traced costs and each of the second traced costs.

17. The media of claim 16, wherein each of the plurality of cost objects includes at least one cost line item that are selectively filterable for accumulation in the total traced cost.

18. The media of claim 16, wherein determining the at least one cost object further comprises employing data collected by a dialog box for at least one property.

19. The media of claim 16, wherein displaying the total cost trace further comprises:
   determining each cost object having one of the first traced costs and the second traced costs;
   determining at least a portion of a display that is available;
   displaying the selected at least one object and each cost object having one of the first traced costs and the second traced costs in the determined portion of the available display; and
   displaying a visualization of at least one allocation rule that corresponds to each cost object that is displayed in the determined portion of the available display.

20. The media of claim 16, further comprising:
   determining at least one intermediate cost object that is on the path characterized by the start point and the endpoint, wherein each intermediate cost object includes an allocation table;
   merging each allocation table for each intermediate cost object on the path in the financial allocation model; and
   generating a cross reference allocation table for the at least one other cost object that is characterized by the end point, wherein the cross reference allocation table is based on a merger of the merged intermediate allocation tables with each allocation table for the at least one other cost object.

* * * * *